(12) United States Patent
Weston-Lewis

(10) Patent No.: US 12,530,416 B2
(45) Date of Patent: Jan. 20, 2026

(54) SYSTEM AND METHOD FOR HYPER-PERSONALIZATION OF USER EXPERIENCE

(71) Applicant: INFOSYS LIMITED, Bangalore (IN)

(72) Inventor: Sebastian Weston-Lewis, London (GB)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/127,104

(22) Filed: Mar. 28, 2023

(65) Prior Publication Data

US 2024/0296192 A1 Sep. 5, 2024

Related U.S. Application Data

(60) Provisional application No. 63/449,821, filed on Mar. 3, 2023.

(51) Int. Cl.
*G06F 16/9535* (2019.01)
*G06F 3/0481* (2022.01)
*G06F 9/451* (2018.01)
*G06F 16/21* (2019.01)

(52) U.S. Cl.
CPC ........ *G06F 16/9535* (2019.01); *G06F 3/0481* (2013.01); *G06F 9/451* (2018.02); *G06F 16/212* (2019.01)

(58) Field of Classification Search
CPC .... G06F 16/9535; G06F 9/451; G06F 16/212; G06F 3/0481; G06F 3/0484; G06F 40/186; G06F 16/9538; G06F 16/9577; G06F 16/958; G06F 9/4451; G06F 16/635; G06F 16/735

USPC ......................................................... 707/722
See application file for complete search history.

(56) References Cited

U.S. PATENT DOCUMENTS

| | | | |
|---|---|---|---|
| 7,409,208 B1 * | 8/2008 | Clare ................. | G06Q 30/0603 709/219 |
| 9,672,538 B1 * | 6/2017 | Vaynblat ............ | G06Q 30/0255 |
| 10,223,458 B1 * | 3/2019 | Decker ............... | G06F 16/9535 |
| 10,748,157 B1 * | 8/2020 | Indyk .................. | G06Q 30/016 |
| 11,069,001 B1 * | 7/2021 | Mascaro ............. | G06Q 40/123 |

(Continued)

OTHER PUBLICATIONS

EP Application No. 23165123.3, Extended European Search Report dated Aug. 24, 2023.

(Continued)

*Primary Examiner* — Evan Aspinwall
(74) *Attorney, Agent, or Firm* — Finnegan, Henderson, Farabow, Garrett & Dunner, LLP

(57) ABSTRACT

This disclosure relates to a method and system for hyper-personalization of user experience. The method includes receiving a data request from a user device of a user upon accessing a page of an application. The page may include a plurality of experience blocks. Each of the plurality of experience blocks may include one or more states. Each of the one or more states may include a unique layout of GUI elements. The method further includes selecting a state from the one or more states for each of the plurality of experience blocks in a data model schema, based on a set of rules and a first user profile of the user associated with the first data request. Further, the method includes rendering the page with each of the plurality of experience blocks in the selected state on the user device to provide a hyper-personalized user experience to the user.

20 Claims, 23 Drawing Sheets

(56) References Cited

U.S. PATENT DOCUMENTS

| | | | | |
|---|---|---|---|---|
| 2003/0028451 | A1* | 2/2003 | Ananian | G06Q 30/0615 |
| | | | | 705/26.42 |
| 2017/0329500 | A1* | 11/2017 | Grammatikakis | G06F 3/0483 |
| 2019/0391825 | A1* | 12/2019 | Jann | G06F 3/0482 |
| 2020/0026772 | A1* | 1/2020 | Wheeler | G06F 16/248 |
| 2021/0141937 | A1* | 5/2021 | Beaumont | H04L 63/1433 |
| 2022/0035988 | A1* | 2/2022 | Mason | G06F 16/24564 |
| 2022/0342949 | A1* | 10/2022 | Furlan | G06Q 30/0255 |
| 2022/0366131 | A1* | 11/2022 | Ekron | G06F 3/013 |
| 2023/0169209 | A1* | 6/2023 | Mukhopadhyay | G06N 5/04 |
| | | | | 726/1 |
| 2024/0111939 | A1* | 4/2024 | Singh | G06Q 10/103 |

OTHER PUBLICATIONS

Ferretti Stefano et al: "Automatic web content personalization through reinforcement learning", Journal of Systems & Software, Elsevier North Holland, New York, NY, US, vol. 121, Feb. 12, 2016 (Feb. 12, 2016), pp. 157-169, XP029725854, ISSN: 0164-1212, DOI: 10.1016/J.JSS.2016.02.008.

Anonymous: "ATG Personalization Guide for 1-24 Business Users", Oracle ATG Web Commerce, Dec. 15, 2012 (Dec. 15, 2012), XP093074416, Retrieved from the Internet: URL:https://web.archive.org/web/20121215094152/https://docs.oracle.com/cd/E35318_02/Platform.10-1-1/ATGPersBusinessGuide/html/s1103specifyingyourvisitorattributes01.htm [retrieved on Aug. 16, 2023].

\* cited by examiner

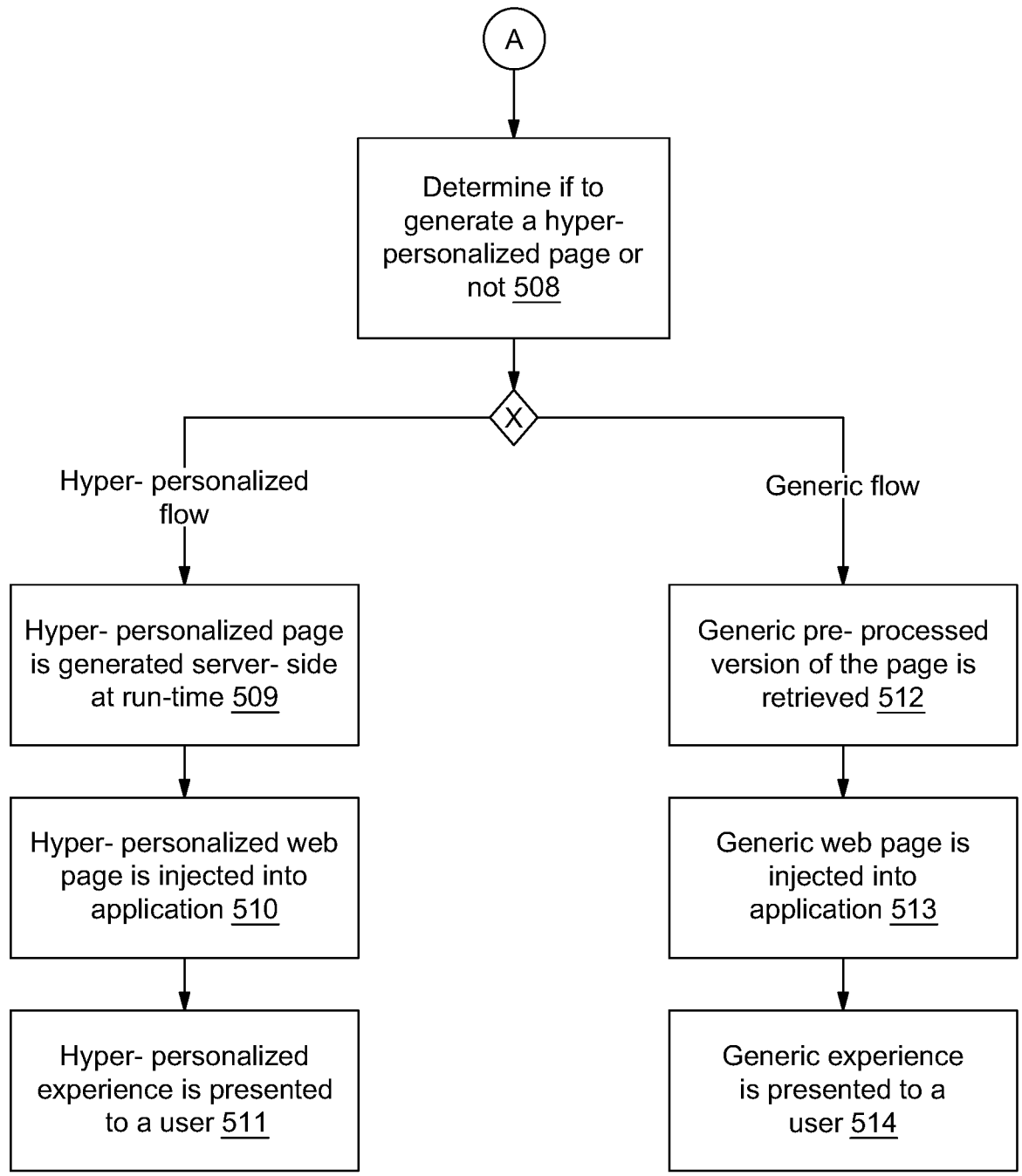
FIG. 5 (Contd.)

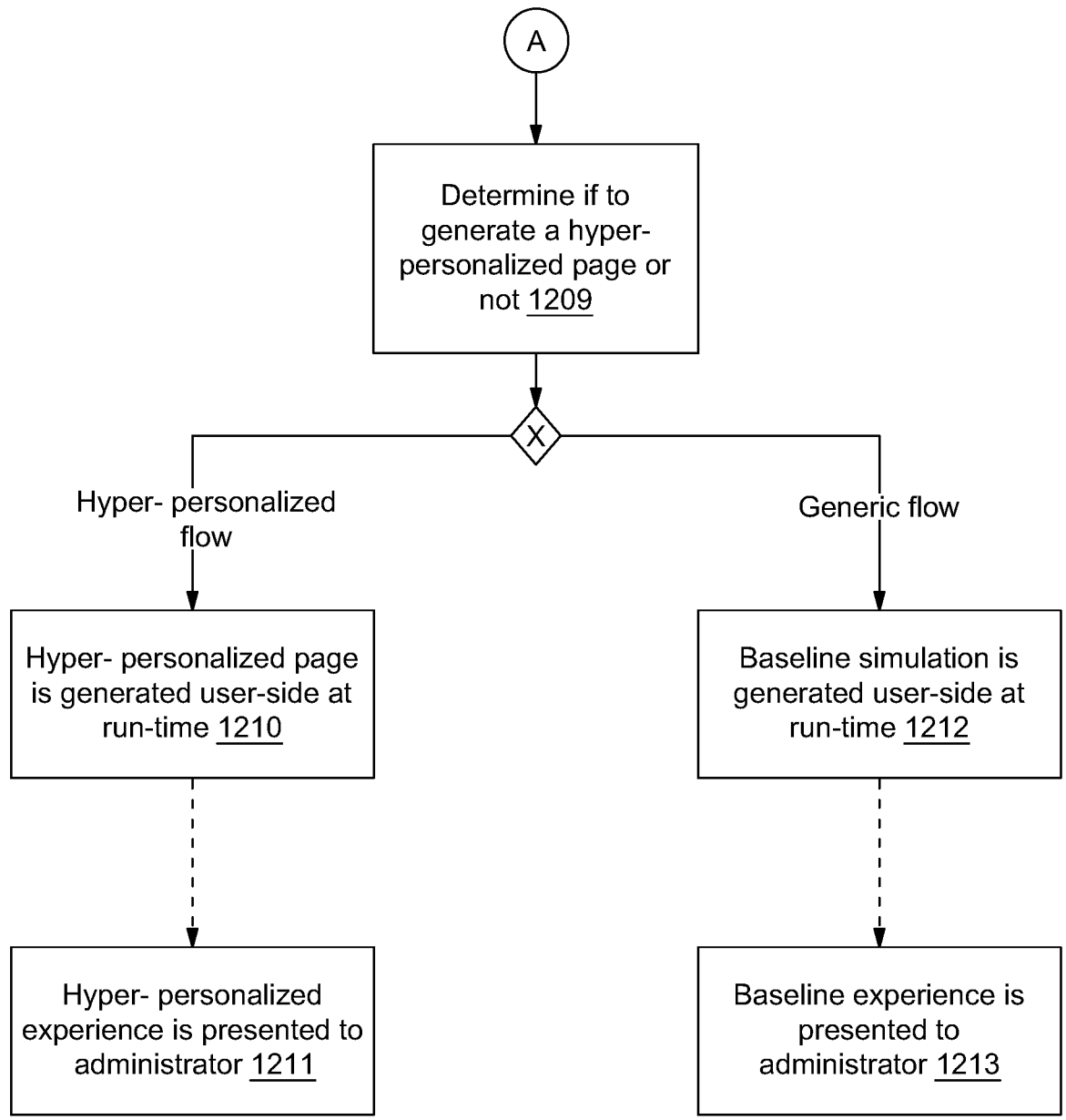
FIG. 12 (Contd.)

| Type 1301 | Dimension 1302 | Dimension Type 1303 | Options 1304 |
|---|---|---|---|
| User-session driven | IP Location | USA | Ip-driven service |
| User Profile DB | Shipment Speed-driver | Array (Options) | [Low, Medium, High] |
| | Price sensitivity driver | Array (Options) | [Low, High] |
| | Preferred payment method | Array (Options) | [Cash, Points] |
| | Language | Array (Options) | [List of all supported languages] |
| | Loyality level | Array (Options) | [L1, L2, L3, L4] |
| | Assistive Expectation level | Array (Options) | [Low, Medium, High, Very High] |
| | Assistive Channel Preference | Array (Options) | [List of Channels] |
| | Size | Array (Options) | [Standard] [list of sizes] |

FIG. 13

User B

| USER DB PROFILE | |
|---|---|
| IP location | USA |
| Shipment speed- driver | Low |
| Price sensitivity driver | Low |
| Preferred payment method | Cash |
| Language | English |
| Loyalty level | L1 |
| Assistive Expecation level | Low |
| Assistive Channel Preference | Generic |
| Size | Known |

1403

$19.99

Select Size     view size chart

SMALL ▽

Based on your previous purchases, SMALL should fit perfect

ADD TO CART

Need help choosing?

△
User C

1400C

| USER DB PROFILE | |
|---|---|
| IP location | USA |
| Shipment speed- driver | Low |
| Price sensitivity driver | Low |
| Preferred payment method | Points |
| Language | English |
| Loyalty level | L1 |
| Assistive Expecation level | Low |
| Assistive Channel Preference | Generic |
| Size | Known |

1405

$10 + 1000 points

Use a mix of points & cash to purchase this item 0                                              1999

Select Size                    view size chart

SMALL ▽

Based on your previous purchases,
SMALL should fit perfect

1406

ADD TO CART

Need help choosing?

FIG. 14C

△
User D

1400D

| USER DB PROFILE | |
|---|---|
| IP location | USA |
| Shipment speed- driver | Low |
| Price sensitivity driver | Low |
| Preferred payment method | Points |
| Language | English |
| Loyalty level | L1 |
| Assistive Expecation level | High |
| Assistive Channel Preference | Online Chat |
| Size | Known |

1407

$10 + 1000 points

Use a mix of points & cash to purchase this item 0                                                                  1999

Select Size                          view size chart

SMALL  ▽

Based on your previous purchases,
SMALL should fit perfect

1408

Need help choosing?
☐ CHAT now with one of our Specialists

ADD TO CART

FIG. 14D

△
User E

1400E

| USER DB PROFILE | |
|---|---|
| IP location | ITALY |
| Shipment speed- driver | Low |
| Price sensitivity driver | Low |
| Preferred payment method | Points |
| Language | Italian |
| Loyalty level | L1 |
| Assistive Expecation level | High |
| Assistive Channel Preference | Online Chat |
| Size | Known |

1409

€10 + 1000 punti

Usa un mix di punti e contanti per acquistare questo oggetto 0                    1999

Seleziona una taglia      visualizza tabella taglie

42 International ▽

Sulla base dei tuoi acquisti precedenti, la taglia 42 (internazionale) dovrebbe essere perfetta Hai bisogno di aiuto per scegliere?
☐ Chatta adesso con uno dei nostri specialisti online

AGGIUNGI AL CARRELLO

△
User F

1400F

| USER DB PROFILE | |
|---|---|
| IP location | USA |
| Shipment speed- driver | Low |
| Price sensitivity driver | Low |
| Preferred payment method | Points |
| Language | English |
| Loyalty level | L4 |
| Assistive Expecation level | Low |
| Assistive Channel Preference | Generic |
| Size | Known |

1411

~~$19.99~~ FREE

As a loyal customer, this one is on us!

Select Size      view size chart

SMALL ▽

Based on your previous purchases, SMALL should fit perfect

REDEEM FOR FREE

Need help choosing?

△
User G

1400G

| USER DB PROFILE | |
|---|---|
| IP location | USA |
| Shipment speed- driver | HIGH |
| Price sensitivity driver | Low |
| Preferred payment method | Points |
| Language | English |
| Loyalty level | L4 |
| Assistive Expecation level | Low |
| Assistive Channel Preference | Generic |
| Size | Known |

~1413

~~$19.99~~ FREE

As a loyal customer, this one is on us!

Select Size     view size chart

SMALL ▽

Based on your previous purchases, SMALL should fit perfect

~1414

Need it fast ?

Get it by tomorrow 8PM with our partner ULTRA- RAID 24h delivery

REDEEM FOR FREE

Need help choosing?

FIG. 14G

△
User H

1400H

| USER DB PROFILE | |
|---|---|
| IP location | USA |
| Shipment speed- driver | Low |
| Price sensitivity driver | HIGH |
| Preferred payment method | Cash |
| Language | English |
| Loyalty level | L1 |
| Assistive Expecation level | Low |
| Assistive Channel Preference | Generic |
| Size | Known |

1415

$19.99 FREE

Price comparison

☐ Competitor A    $19.99    PRICE MATCH

☐ Competitor B    $21.95

☐ Competitor C    $22.00 + $5 Shipping cost

Select Size                    view size chart

SMALL ▽

Based on your previous purchases, SMALL should fit perfect

ADD TO CART

Need help choosing?

△
User I

14001

| USER DB PROFILE | |
|---|---|
| IP location | USA |
| Shipment speed- driver | HIGH |
| Price sensitivity driver | HIGH |
| Preferred payment method | Cash |
| Language | English |
| Loyalty level | L1 |
| Assistive Expecation level | HIGH |
| Assistive Channel Preference | Online Chat |
| Size | Known |

1417

$19.99 FREE

Price comparison
☐ Competitor A   $19.99   [PRICE MATCH]
☐ Competitor B   $21.95
☐ Competitor C   $22.00 + $5 Shipping cost Select Size                    view size chart
[SMALL ▽]

Based on your previous purchases,
SMALL should fit perfect

Need it fast ?
Get it by tomorrow 8PM with our partner
ULTRA- RAID 24h delivery

Need help choosing?
☐ CHAT now with one of our Specialists

[ ADD TO CART ]

SYSTEM AND METHOD FOR HYPER-PERSONALIZATION OF USER EXPERIENCE

The present application claims priority to U.S. Provisional Patent Application Ser. No. 63/449,821, filed Mar. 3, 2023.

TECHNICAL FIELD

This disclosure relates generally to hyper-personalization, and more particularly to a method and a system for hyper-personalization of user experience.

BACKGROUND

Hyper-personalization is a process of tailoring products or services to individual users based on their preferences, behaviors, and past interactions. The objective of hyper-personalization is to enhance user engagement and satisfaction by delivering highly relevant and customized content, features, and recommendations. The hyper-personalization may be applied to a wide range of products and services, including, but not limited to, retail, e-commerce, online advertising, social media, telecommunications, insurance, automotive industry, financial services, travel, transportation, logistics, real estate, public and social sector, sports, energy, mining, healthcare, education, and consumer packaged goods.

Currently, there exist some technologies that focus on content recommendation and price generation. However, in the existing techniques consumer or enterprise experience is just a piece of pre-compiled code which may result in a single common experience that is being served to all the customers. Therefore, to address these challenges, there is a need in the present state of art, for techniques that provide customized or hyper-personalized experience to each user based on their respective user profile.

SUMMARY

In one embodiment, a method for hyper-personalization of user experience is disclosed. In one example, the method may include receiving a data request from a user device of a user upon accessing a page of an application hosted by a server. The page may include a plurality of experience blocks. Each of the plurality of experience blocks may include one or more states. Each of the one or more states may include a unique layout of Graphical User Interface (GUI) elements. Further, the method may include selecting a state from the one or more states for each of the plurality of experience blocks in a data model schema of the page, based on a set of rules and a first user profile of the user associated with the first data request. Further, the method may include rendering the page with each of the plurality of experience blocks in the selected state on the user device to provide a hyper-personalized user experience to the user.

In one embodiment, a system for hyper-personalization of user experience is disclosed. In one example, the system may include a processing circuitry and a memory communicatively coupled to the processing circuitry. The processing circuitry may store processor-executable instructions, which, on execution, may cause the processing circuitry to receive a data request from a user device of a user upon accessing a page of an application hosted by a server. The page may include a plurality of experience blocks. Each of the plurality of experience blocks may include one or more states. Each of the one or more states may include a unique layout of Graphical User Interface (GUI) elements. The processor-executable instructions, on execution, may further cause the processing circuitry to select a state from the one or more states for each of the plurality of experience blocks in a data model schema of the page, based on a set of rules and a first user profile of the user associated with the first data request. The processor-executable instructions, on execution, may further cause the processing circuitry to render the page with each of the plurality of experience blocks in the selected state on the user device to provide a hyper-personalized user experience to the user.

In one embodiment, a non-transitory computer-readable medium storing computer-executable instructions for hyper-personalization of user experience is disclosed. In one example, the stored instructions, when executed by a processor, cause the processor to perform operations including receiving a data request from a user device of a user upon accessing a page of an application hosted by a server. The page may include a plurality of experience blocks. Each of the plurality of experience blocks may include one or more states. Each of the one or more states may include a unique layout of Graphical User Interface (GUI) elements. The operations may further include selecting a state from the one or more states for each of the plurality of experience blocks in a data model schema of the page, based on a set of rules and a first user profile of the user associated with the first data request. The operations may further include rendering the page with each of the plurality of experience blocks in the selected state on the user device to provide a hyper-personalized user experience to the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 13 illustrates an exemplary user profile database of a user, in accordance with an exemplary embodiment of the present disclosure;

FIGS. 14A-14I illustrate exemplary GUIs presenting a plurality of experience blocks in one or more states, in accordance with an exemplary embodiment of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
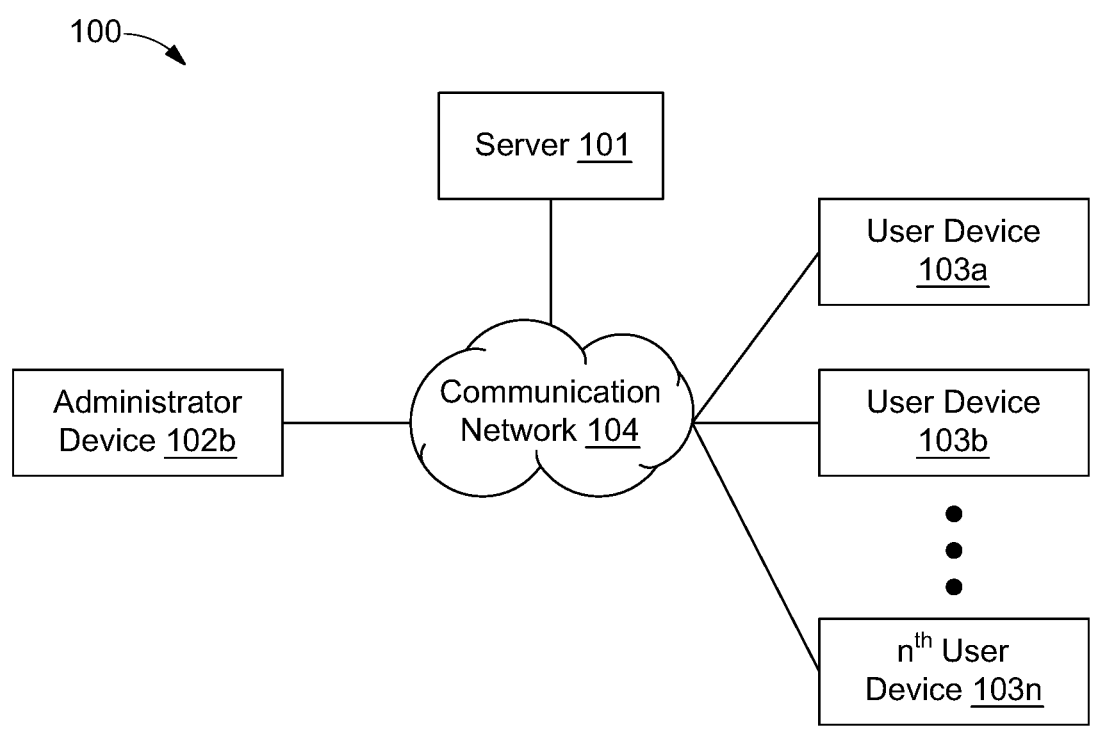
FIG. 1 is a block diagram of an environment for hyper-personalization of user experience, in accordance with an exemplary embodiment of the present disclosure.

FIG. 1 is a diagram that illustrates an environment 100 for hyper-personalization of user experience, in accordance with an exemplary embodiment of the present disclosure.

The environment 100 may include a server 101, an administrator device 102 associated with a first virtual user, and a plurality of user devices (e.g., a first user device 103$a$, a second user device 103$b$, ..., an n$^{th}$ user device 103$n$) associated with a plurality of users. The server 101 may be a centralized server or a group of decentralized servers that may be communicatively coupled with the administrator device 102, and the plurality of user devices via a communication network 104. Examples of the communication network 104 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

In order to provide hyper-personalized user experience to a user, initially the communication network 104 may facilitate the user of the first user device 103$a$ to communicate with the server 101 for accessing a page of an application. In some embodiments, the communication network 104 may facilitate the user of more than one user devices for accessing the page. For example, in one embodiment, the page may be accessed by the user of the second user device 103$b$. In another embodiment, the page may be accessed by the user of the n$^{th}$ user device 103$n$.

The page (such as, a web page) may be a homepage of the application, a product details page of the application, a login page of the application, or a checkout page of the application. The application may be a website, a web application, a micro-website, a mobile application, or an intranet of any of the following sectors including, but are not limited to, retail, E-commerce, online advertising, social media, telecommunications, insurance, automotive industry, financial services, travel, transportation, logistics, real estate, public and social sector, sports, energy, mining, healthcare, education, or consumer packaged goods.

Examples of the user device may include a smartphone, a tablet, a laptop, a desktop, a notebook, a mobile phone, an application server, or the like. The page may include a plurality of experience blocks. Each of the plurality of experience blocks may include one or more states. Furthermore, each of the one or more states may include a unique layout of Graphical User Interface (GUI) elements.

Upon accessing the page of the application by the user device and upon reception of the data request (e.g., a first data request received from the first user device 103$a$), the server 101 may further access a user profile (such as, a first user profile) corresponding to the user of the first user device 103$a$. The first user profile may include a set of user parameters and an associated set of parameter values.

Further, the server 101 may select a state from the one or more states for each of the plurality of experience blocks in a data model schema of the page, based on a set of rules and the user profile of the user associated with the first data request. Once the state from the one or more states is selected, the server 101 may further render the page with each of the plurality of experience blocks in the selected state on the user device to provide the hyper-personalized user experience to the user.

As will be appreciated, in order to experience how a hyper-personalized page rendered to the user may actually look like, a simulation may be performed on the administrator device 102. In the simulation process, the server 101 may communicate with the administrator device 102 via the communication network 104 to create a virtual user along with a user profile associated with the virtual user. The complete process of simulation is explained in greater detail in conjunction with FIG. 2.

Figure 2:
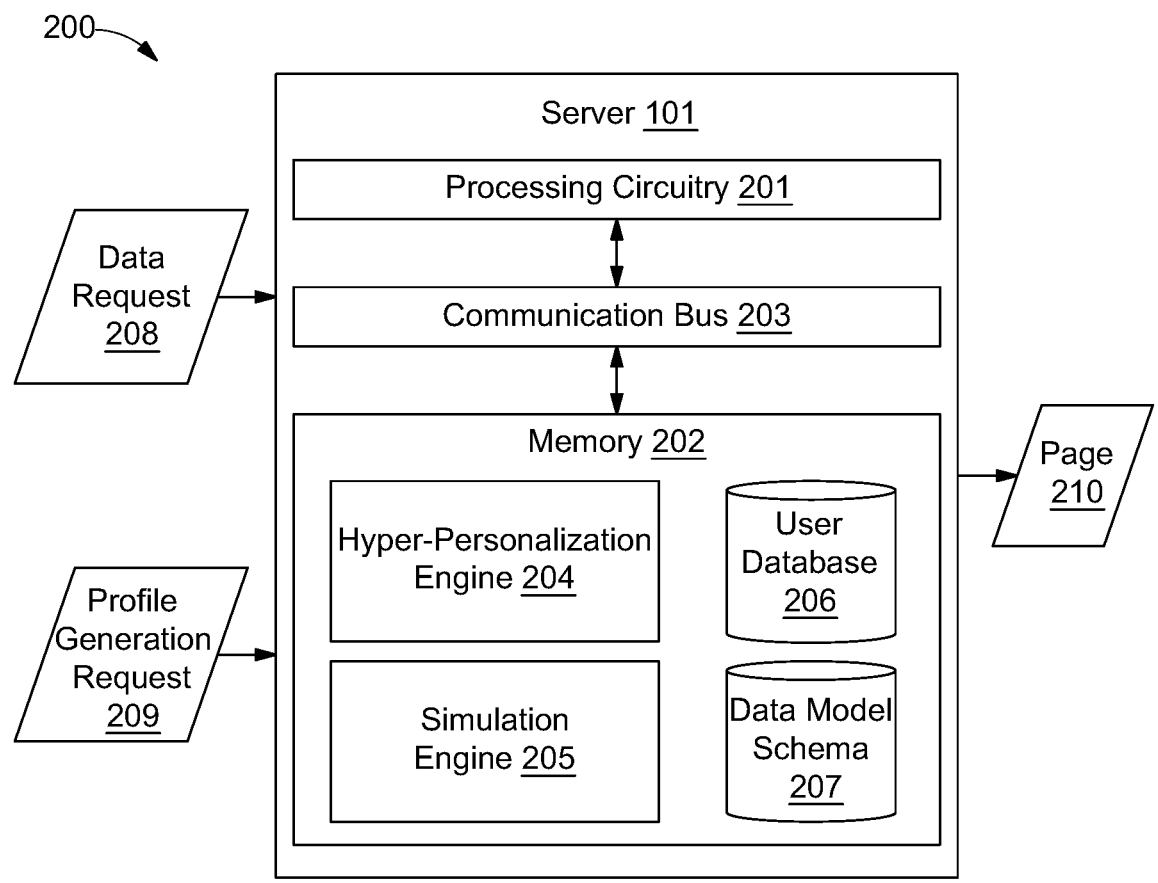
FIG. 2 is a block diagram of a process for hyper-personalization of user experience, in accordance with an exemplary embodiment of the present disclosure.

FIG. 2 is a diagram that illustrates a process for hyper-personalization of user experience, in accordance with an exemplary embodiment of the present disclosure. FIG. 2 is explained in conjunction with elements from FIG. 1. For ease of explanation, the process is explained for a single user device. However, each of the engines 204-205 of the server 101 may perform similar steps for other user devices as well. The server 101 may include a processing circuitry 201 and a memory 202 communicatively coupled to the processing circuitry 201 via a communication bus 203. The memory 202 may be a non-volatile memory or a volatile memory. Examples of non-volatile memory may include, but are not limited to, a flash memory, a Read Only Memory (ROM), a Programmable ROM (PROM), Erasable PROM (EPROM), and Electrically EPROM (EEPROM) memory. Examples of volatile memory may include, but are not limited to, Dynamic Random Access Memory (DRAM), and Static Random-Access Memory (SRAM).

The memory 202 may store processor instructions. The processor instructions, when executed by the processing circuitry 201, may cause the processing circuitry 201 to implement one or more embodiments of the present disclosure such as, but not limited to, receive a data request from a user device, select a state from the one or more states, and render the page to provide a hyper-personalized user experience to the user. The memory 202 may also store various data (e.g., user profile of the plurality of users, a set of parameters, a set of parameter values associated with each of the user profile, a plurality of experience blocks of the page, default state for each of the plurality of experience blocks, etc.) that may be captured, processed, and/or required by the processing circuitry 201 of the server 101 to provide hyper-personalized user experience to the user. The memory 202 may include various engines i.e., a hyper-personalization engine 204, a simulation engine 205, a user database 206, and a data model schema 207 that enables the server 101 to perform hyper-personalization of user experience.

In order to provide hyper-personalized user experience to the user, initially, the hyper-personalization engine 204 may allow the user to access a page 210 of an application (e.g., a website, a web application, or a mobile application, etc.). The page 210 may include a plurality of experience blocks. Each of the plurality of experience blocks may be a self-contained experience component (e.g., a buy box, a login form, a multi-media component, a footer, etc.) of the page 210. In some embodiments, the blocks may be nested at a plurality of levels. A nested experience block may include an independent set of rules. Further, each of the plurality of experience blocks may include one or more states. Additionally, each of the one or more states may include a unique layout of Graphical User Interface (GUI) elements. For each of the plurality of experience blocks, the one or more states may include a default state.

Upon accessing the page 210 of the application, the hyper-personalization engine 204 may receive a first data request 208 from a user device (such as, the first user device 103a) through the processing circuitry 201. Based on the reception of the first data request 208, the hyper-personalization engine 204 may access a first user profile corresponding to the user of the first user device 103a. It should be noted that the first user profile of the user may be stored in a user database 206 (e.g., an internal database or a third-party database) of the server 101.

The first user profile may include a set of user parameters. By way of an example, if the user is accessing an E-commerce website page, in that case the set of user parameters may be, for example, but are not limited to, an Internet Protocol (IP) location of the user accessing the corresponding page, a shipment speed-driver information, a price sensitivity driver information, a preferred payment method information of the user, a language information of the user, a loyalty level information of the user, an assistive expectation level information, an assistive channel preference of the user, or a size of product.

Each set of user parameters may include an associated set of parameter values. For example, for the parameter 'IP location', the corresponding set of user parameters may be, for example, 'USA', 'UK', 'Russia', 'Italy', etc. Similarly, for the parameter 'shipment speed-driver' the corresponding set of user parameters may be, for example, 'Low', 'Medium', 'High', etc. For the parameter 'Price sensitivity driver', the corresponding set of user parameters may be, for example, 'Low', 'Medium', etc. For the parameter 'Preferred payment method' the corresponding set of user parameters may be, for example, 'Cash, Points', etc. For the parameter 'Language' the corresponding set of user parameters may be, for example, 'English', 'Italic', 'Spanish', 'Hindi', etc. For the parameter 'Loyalty level' the corresponding set of user parameters may be, for example, 'L1', 'L2', 'L3', 'L4', etc. For the parameter 'Assistive Expecation level' the corresponding set of user parameters may be, for example, 'Low', 'Medium', 'High', 'Very High', etc. For the parameter 'Assistive Channel Preference' the corresponding set of user parameters may be, for example, 'Generic', 'Online chat', etc. For the parameter 'Size' the corresponding set of user parameters may be, for example, 'Standard', 'Medium', 'small', etc.

Further, the hyper-personalization engine 204 may select a state from the one or more states for each of the plurality of experience blocks in a data model schema 207 of the page 210, based on a set of rules and the first user profile of the user associated with the first data request. The data model schema 207 may be stored in a schema database that may include a plurality of page layouts. The set of rules may determine which state is to be selected from the one or more states.

For example, the set of rules may include one or more conditions corresponding to at least one user parameter and an associated state of an experience block, and for each experience block of the plurality of experience blocks, determination of the state may be based on at least one of the one or more conditions. The condition may be a mapping between at least one user parameter and the associated state of the experience block. Further, each of the one or more conditions may be computed based on the data model schema, based on one of a user session, a declared variable, or at least one user parameter of the first user profile. The one or more conditions may be, for example, IF [x] is [operator]=[A] then State=[1]; IF [x] is [operator]=[A] AND [y] is [operator]=[B] then State=[1]. It should be noted that the one or more conditions may be variable (i.e., the declared variable) or a user session-derived (i.e., size of screen or type of user device). A source of the one or more conditions may be selected from the data model schema, dimensions, and an individual dimension array. If any experience block is nested within another experience block, it may retain its independence in terms of rules logic.

Once the state is selected, the hyper-personalization engine 204 may further render the page 210 with each of the plurality of experience blocks in the selected state on the user device to provide a hyper-personalized user experience to the user. In particular, to provide the hyper-personalized user experience to the user, the server 101 may render a GUI on a display of the user device.

As will be appreciated, prior to deploying the process of hyper-personalization on the user device and to experience how the hyper-personalized page rendered to the user may actually look like, a simulation may be performed on the administrator device 102 through the simulation engine 205. In particular, the simulation engine 205 may receive a profile generation request 209 from the administrator device 102 for creation of a virtual user. The profile generation request 209 may include data for generation of a second user profile for the virtual user.

Based on the profile generation request 209, the simulation engine 205 may generate the second user profile. The second user profile may include a set of virtual user parameters associated with the virtual user. It should be noted that the second user profile may be generated for a simulation purpose only and has nothing to do with the user profile of a real user.

Once the second user profile is generated, the simulation engine 205 may select a state from the one or more states for each of the plurality of experience blocks in the data model schema of the page, based on the set of rules and the second user profile. Further, the simulation engine 205 may render the page with each of the plurality of experience blocks in the selected state on the administrator device 102.

In some embodiments, if the data request is from a new user that is accessing the page for the first time, in that case the hyper-personalization engine 204 may query the user database 206 to identify a user profile of the user. Further, based on the query, the hyper-personalization engine 204 may determine an absence of a user profile of the user in the database.

Based on determination, the hyper-personalization engine 204 may generate the first user profile of the user. In this scenario, the set of parameter values may correspond to a set of default values, the selected state for each of the plurality of experience blocks may be the default state, and the selection of the default state for each of the plurality of experience blocks may be based on the set of parameter values. In other words, when the user profile of the new user is unavailable in the user database 204, then the page may be rendered with each of the plurality of experience blocks in the default state. The default state may be one of an existing state within the block.

In some embodiments, once the page with each of the plurality of experience blocks is rendered in the selected state on the user device, the hyper-personalization engine 204 may track activity of the user on the rendered page. The tracked activity may be, for example, but is not limited to, time spent on the page, user actions on the page, or user interaction with the GUI elements of the page. Based on the tracked activity, the hyper-personalization engine 204 may update the first user profile and the associated set of parameter values.

In some embodiments, once the first user profile is updated, the hyper-personalization engine 204 may receive a second data request from the user device of the user upon accessing the page. It should be noted that the first data request may be received at a first time-instance and the second data request may be received at a second time-instance after the first time instance.

Further, the hyper-personalization engine 204 may select a state from the one or more states for each of the plurality of experience blocks in the data model schema 207 of the page, based on the set of rules and the updated first user profile. Thereafter, the page 210 with each of the plurality of experience blocks may be rendered in the selected state on the user device to provide the hyper-personalized user experience to the user.

It should be noted that all such aforementioned engines 204-205 may be represented as a single engine or a combination of different engines. Further, as will be appreciated by those skilled in the art, each of the engines 204-205 may reside, in whole or in parts, on one device or multiple devices in communication with each other. In some embodiments, each of the engines 204-205 may be implemented as dedicated hardware circuit comprising custom application-specific integrated circuit (ASIC) or gate arrays, off-the-shelf semiconductors such as logic chips, transistors, or other discrete components. Each of the engines 204-205 may also be implemented in a programmable hardware device such as a field programmable gate array (FPGA), programmable array logic, programmable logic device, and so forth. Alternatively, each of the engines 204-205 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for hyper-personalization of user experience. For example, the exemplary server 101 may provide hyper-personalization of user experience to the user by the processes discussed herein. In particular, as will be appreciated by those of ordinary skill in the art, control logic and/or automated routines for performing the techniques and steps described herein may be implemented by the server 101 either by hardware, software, or combinations of hardware and software. For example, suitable code may be accessed and executed by the one or more processors on the server 101 to perform some or all of the techniques described herein. Similarly, application specific integrated circuits (ASICs) configured to perform some or all of the processes described herein may be included in the one or more processors on the server 101.

Figure 3:
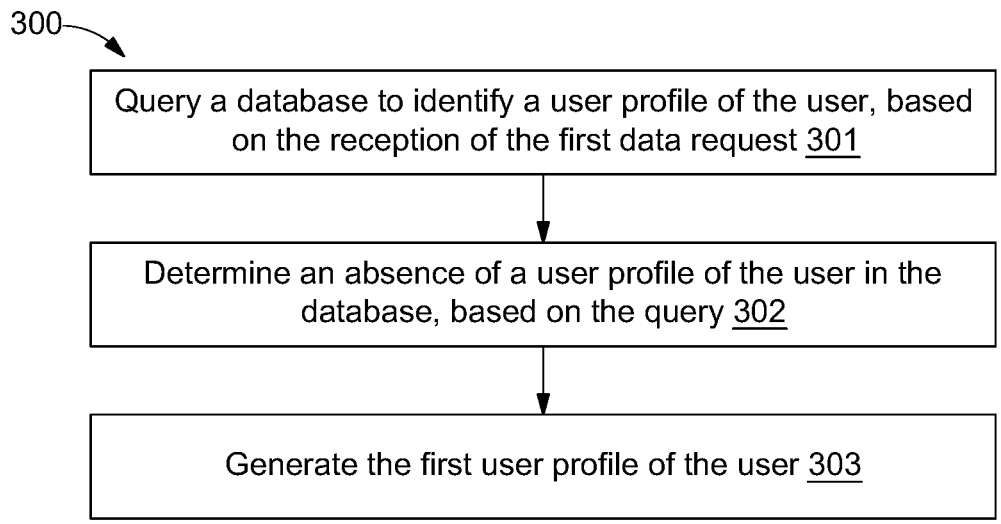
FIG. 3 is a flow diagram of an exemplary process for generating a first user profile of a user, in accordance with an exemplary embodiment of the present disclosure.

FIG. 3 is a diagram that illustrates an exemplary process 300 for generating a first user profile of a user is depicted via a flowchart, in accordance with an exemplary embodiment of the present disclosure. FIG. 3 is explained in conjunction with elements from FIGS. 1 and 2. In an embodiment, the process 300 may be implemented by the server 101. It should be noted that the first user profile may be generated for the user that may render a page of an application for the first time.

The process 300 may include querying, by the server 101, a database to identify a user profile of the user, based on the reception of the data request, at step 301. Further, to generate the first user profile, the process 300 may include determining, by the server 101, an absence of a user profile of the user in the database, based on the querying, at step 302.

Figure 14A:
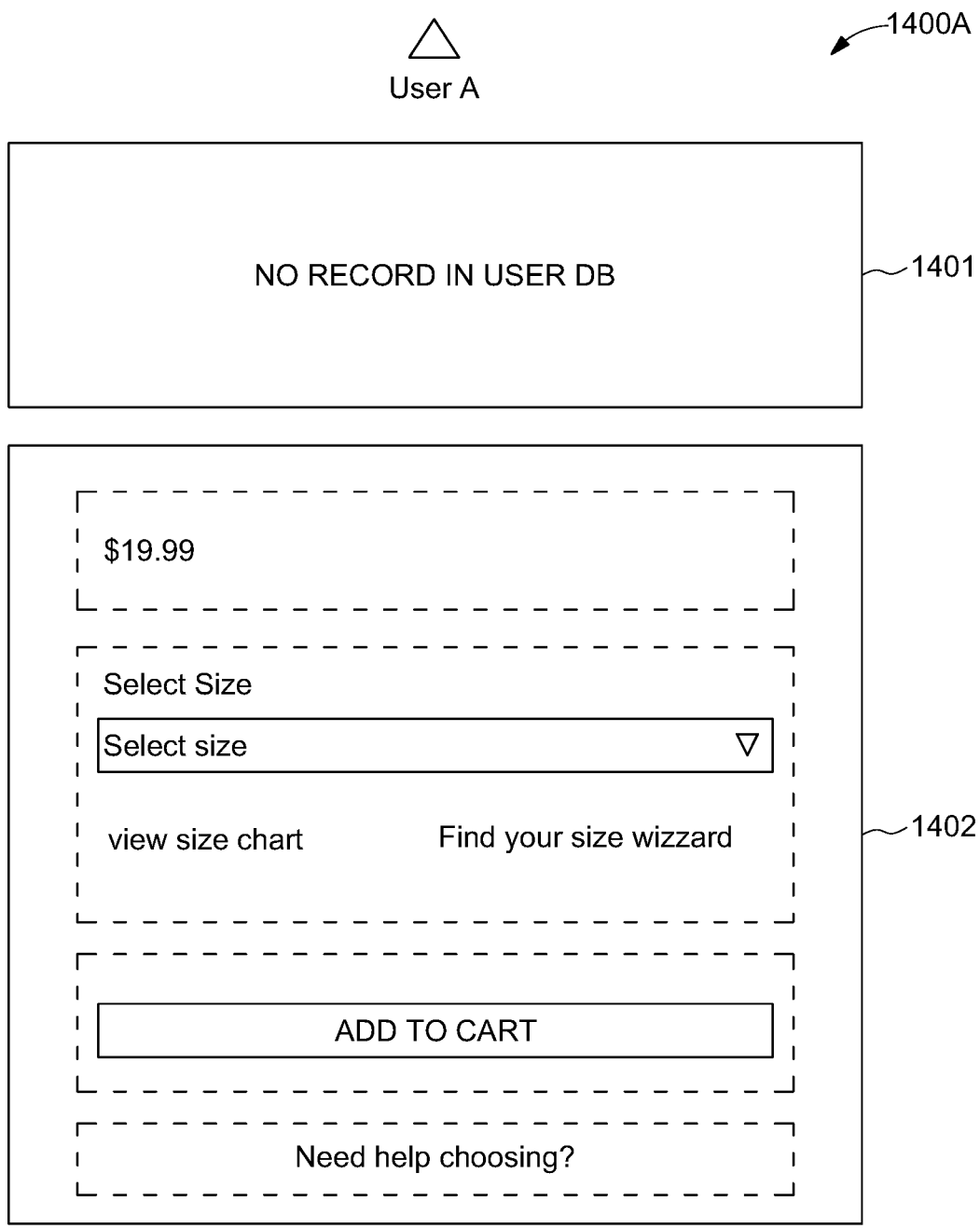

Further, the process 300 may include generating, by the server 101, the first user profile of the user, at step 303. It should be noted that for the generated first user profile of the user, the set of parameter values may correspond to a set of default values. Further, the selected state for each of the plurality of experience blocks may be the default state. Furthermore, the selection of the default state for each of the plurality of experience blocks may be based on the set of parameter values. An exemplary page rendered on the user device with the plurality of blocks in the default state, when no record of the user profile is found in the user database, is depicted in FIG. 14A via a GUI 1400A.

Figure 4:
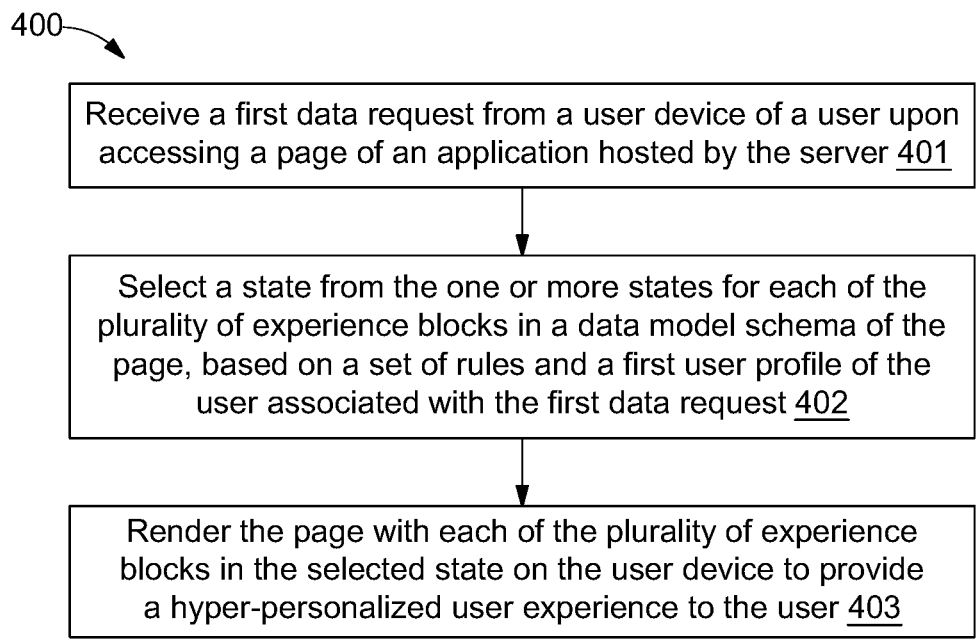
FIG. 4 is a flow diagram of an exemplary process for hyper-personalization of user experience, in accordance with an exemplary embodiment of the present disclosure.

FIG. 4 is a flow diagram that illustrates an exemplary process 400 for hyper-personalization of user experience, in accordance with an exemplary embodiment of the present disclosure. FIG. 4 is explained in conjunction with elements from FIGS. 1, 2, and 3. In an embodiment, the process 400 may be implemented by the server 101. The process 400 may include receiving, by a server, a data request from a user device of a user upon accessing a page of an application hosted by the server, at step 401. The page may include a plurality of experience blocks. Each of the plurality of experience blocks may include one or more states. Each of the one or more states may include a unique layout of GUI elements. It should be noted that for each of the plurality of experience blocks, the one or more states may include a default state. In some embodiments, each of the plurality of experience blocks may be nestable at a plurality of levels, and a nested experience block may include an independent set of rules.

Further, the process 400 may include selecting, by the server, a state from the one or more states for each of the plurality of experience blocks in a data model schema of the page, based on a set of rules and a first user profile of the user associated with the first data request, at step 402. The first user profile may include a set of parameter values for a set of user parameters. The set of rules may include one or more conditions corresponding to at least one user parameter and an associated state of an experience block, and for each experience block of the plurality of experience blocks, determination of the state may be based on at least one of the one or more conditions. The condition may be a mapping between at least one user parameter and the associated state of an experience block.

In some embodiments, each of the one or more conditions may be computed based on the data model schema, based on one of a user session, a declared variable, or at least one user parameter of the first user profile. In some embodiments, the server may determine one or more data model dimensions represented within a page-associated variable array of the data model schema through one of the user session, the declared variable, or the at least one user parameter.

Further, the process 400 may include rendering, by the server, the page with each of the plurality of experience blocks in the selected state on the user device to provide a hyper-personalized user experience to the user, at step 403. In should be noted that, the page may be rendered on a display of the user device via a GUI.

Figure 5:
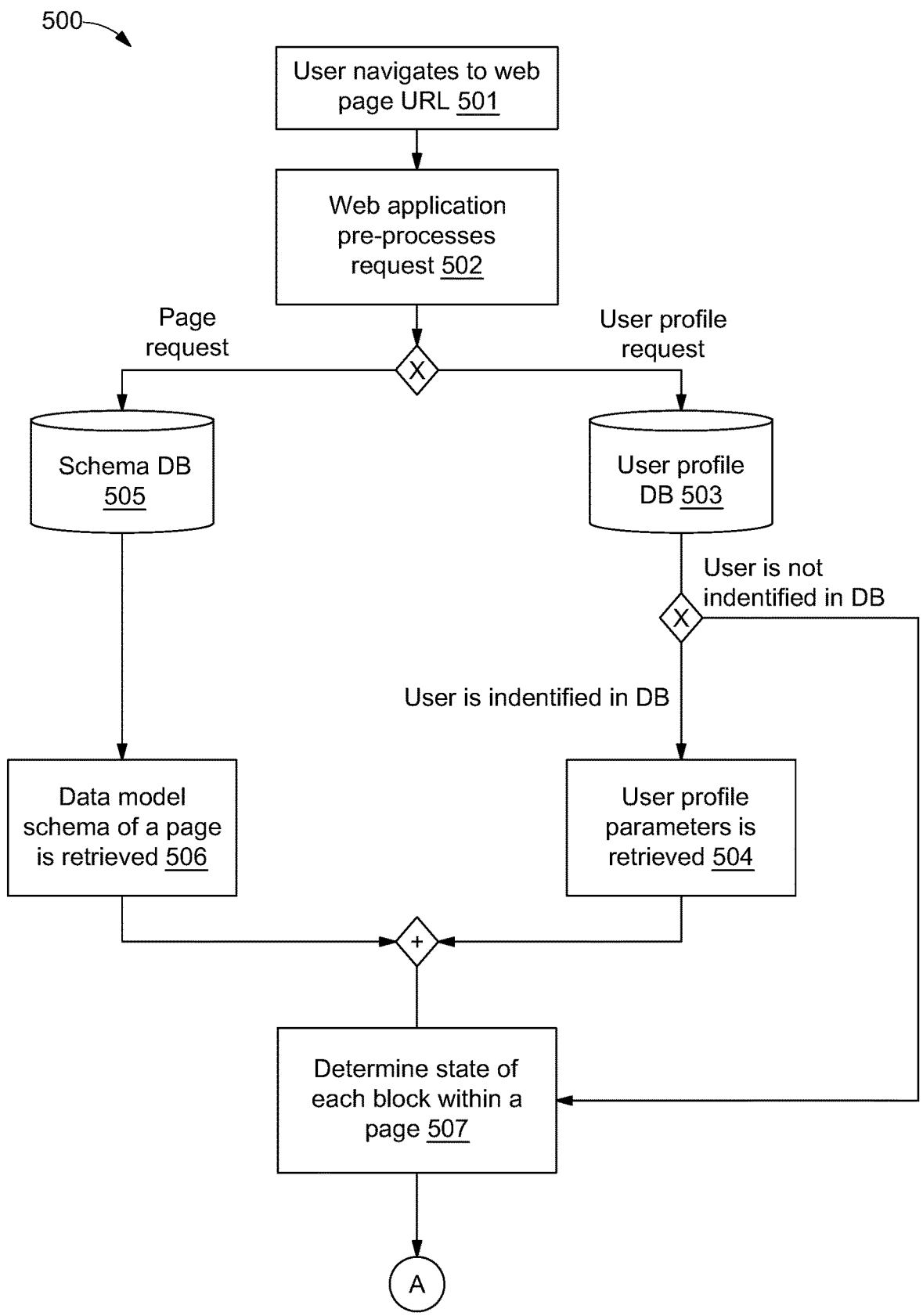
FIG. 5 is a flow diagram of a detailed exemplary control logic for hyper-personalization of user experience, in accordance with an exemplary embodiment of the present disclosure.

FIG. 5 is a flow diagram that illustrates an exemplary control logic 500 for hyper-personalization of user experience, in accordance with an exemplary embodiment of the present disclosure. FIG. 5 is explained in conjunction with elements from FIGS. 1, 2, 3, and 4. In an embodiment, the control logic 500 may be implemented by the server 101. At step 501, a user may navigate to a page Uniform Resource Locator (URL) (e.g., a web page URL). The web page URL may redirect the user to an application (e.g., a web application). Based on the web page URL, the user may access the web application. Upon accessing the web application, a data request may be received on the web application. Further, at step 502, the application may pre-process the data request.

Upon pre-processing the data request, the web application may share a page request with a schema database and a user profile request with a user profile database. In case of the user profile request, the control logic 500 may search for a user profile of the user that is accessing the application from the user profile database, at step 503. If the user profile of the corresponding user is identified in user profile database, then at step 504, a set of user profile parameters may be retrieved from the user profile database. If the user profile of the corresponding user is not identified in the user profile database, then that user may be recognized as a new user or a first-time user.

In case of the page request, the control logic 500 may search for the page from the schema database, at step 505. Further, a data model schema of the page may be retrieved from the schema database, at step 506. The data model schema of the page may include a plurality of experience blocks, each of the plurality of experience blocks may include one or more states (e.g., default state or hyper-personalized state), and each of the one or more states may include a unique layout of GUI elements.

Once the page request and the user profile request are pre-processed, further, at step 507, a state of each experience block within the page may be determined based on a set of rules associated with the data model schema and based on both type of users (i.e., the user whose user profile is identified in the user profile database and the user whose user profile is not identified in the user profile database). Each of the set of rules may include one or more conditions corresponding to at least one user parameter and an associated state of an experience block. The condition may be a mapping between at least one user parameter and the associated state of an experience block. For each experience block of the plurality of experience blocks, determination of the state may be based on at least one of the one or more conditions.

In addition to determination of the state, the control logic 500 may further determine whether to generate a hyper-personalized page a default page (e.g., generic page) based on the set of rules, at step 508. Further, the control logic 500 may generate the hyper-personalized page on a server-side for the user whose user profile is identified in the database based on the user profile parameters, at step 509.

Further, the hyper-personalized page generated on the server-side may be injected into the application, at step 510. Thereafter, a hyper-personalized experience may be provided to the user, at step 511. It should be noted that the hyper-personalized experience may be provided to the user by rendering a hyper-personalized page on a user device via a GUI.

As the hyper-personalized page is generated for the user whose user profile is identified in the database, in a similar way, a default page (e.g., generic pre-processed version of page) may be rendered on the server-side for the user whose user profile is not identified in the database, at step 512. Further, the generic version of page may be injected into the application, at step 513. Furthermore, a generic experience may be presented to the user, at step 514.

Figure 6:
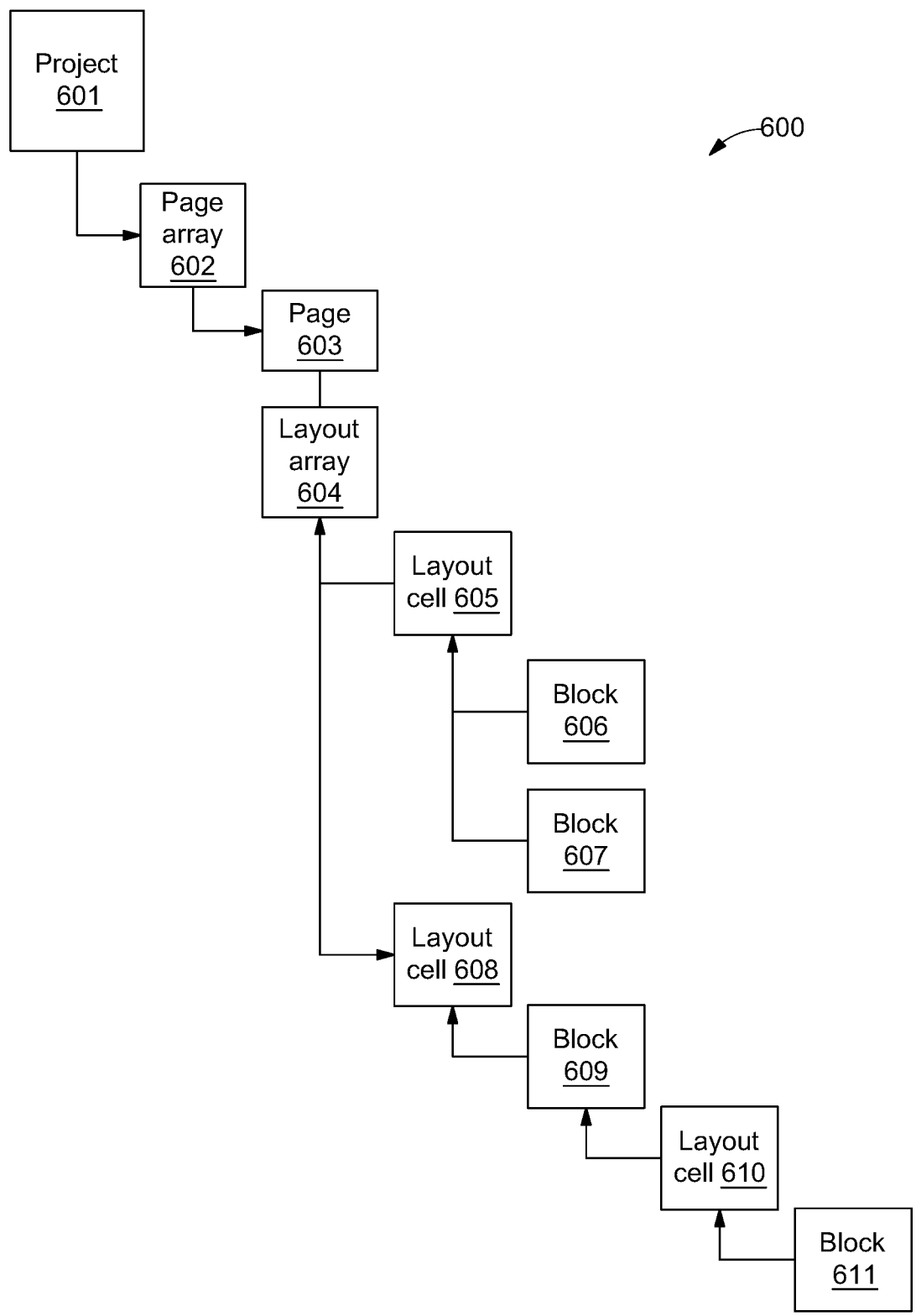
FIG. 6 is a structural diagram of a page for hyper-personalization of user experience, in accordance with an exemplary embodiment of the present disclosure.

FIG. 6 is a structural diagram 600 of a page for hyper-personalization of user experience, in accordance with an exemplary embodiment of the present disclosure. FIG. 6 is explained in conjunction with elements from FIGS. 1, 2, 3, 4, and 5. The structure diagram 600 illustrates a project 601. The project 601 may correspond to an application. The application may be a website, a web application, a micro-website, or an intranet on which the user performs one or more user actions. The project 601 may include a page array 602. The page array 602 may further include a page 603. In particular, the page array 602 may be used to store and manage data related to the page 603.

The page 603 (e.g., web page) may be a self-contained experience entity of the application. Examples of the page 603 may include, but is not limited to, a homepage of the application, a product details page of the application, a login page of the application, or a checkout page of the application. The page 603 may further include a layout array 604. The layout array 604 of the page 603 may include one or more layout cells (e.g., a layout cell 605 and a layout cell 608). A plurality of experience blocks (e.g., a block 606, a block 607, a block 609, and a block 611) may be embedded with each of the one or more layout cells. For example, the block 606, and the block 607 may be embedded within the layout cell 605, the block 609 may be embedded within the layout cell 608, and the block 611 may be embedded within a layout cell 610.

Figure 7:
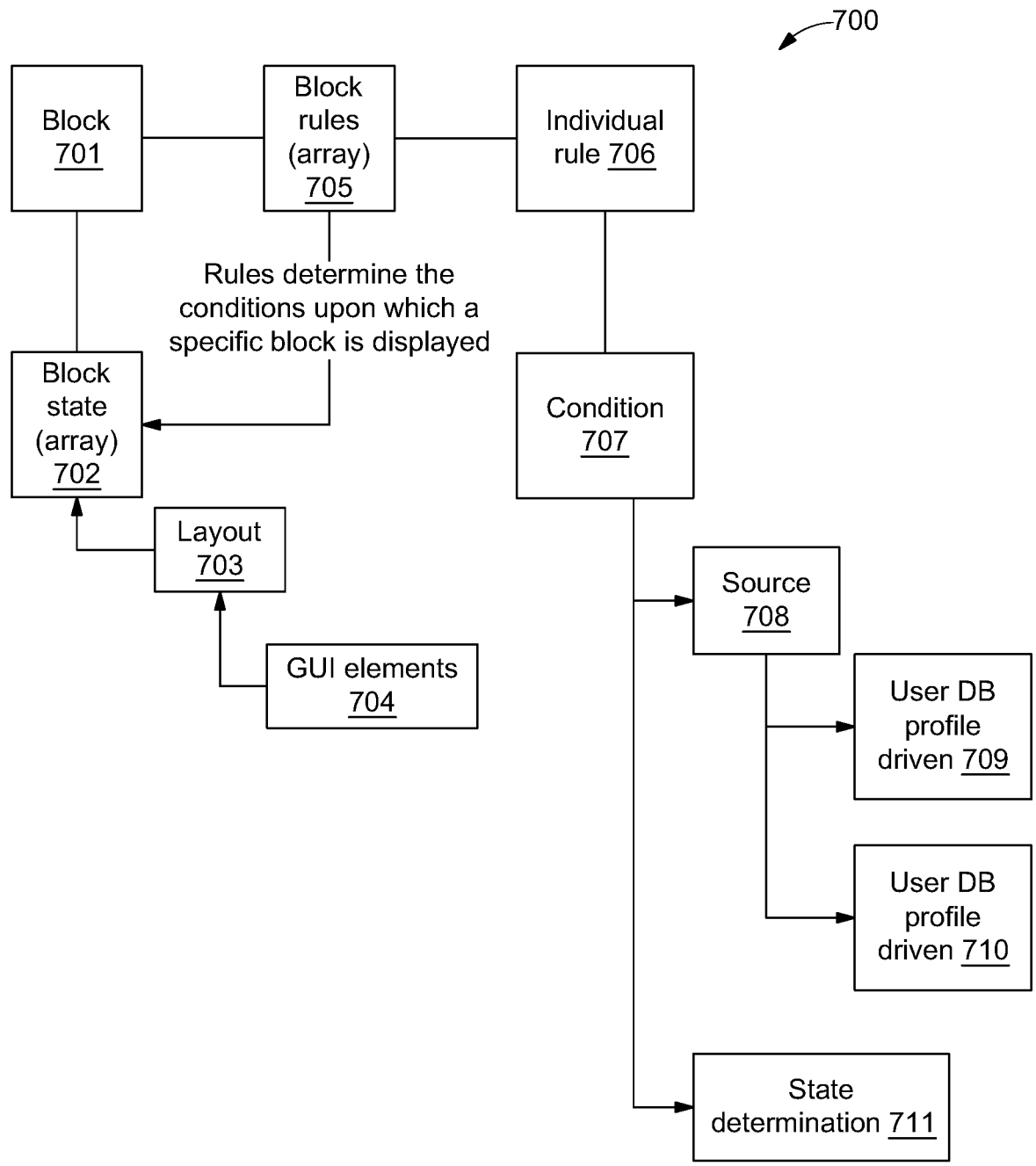
FIG. 7 is a structural diagram of an experience block corresponding to a page, in accordance with an exemplary embodiment of the present disclosure.

FIG. 7 is a structural diagram 700 of an experience block corresponding to a page, in accordance with an exemplary embodiment of the present disclosure. FIG. 6 is explained in conjunction with elements from FIGS. 1, 2, 3, 4, 5, and 6. It should be noted that a block 701 of the structural diagram 700 may be analogous to the block 606 of the structural diagram 600. The block 701 (e.g., an experience block) may be a self-contained experience component of the page.

Examples of the block 701 may include, but is not limited to, a buy box component of the page, a login component of the page, a multi-media component of the page, or a footer component of the page. The block 701 may include one or more states (e.g., block state (array) 702). For each block, the one or more states may include a default state. The default state may be an existing state (e.g., a generic state) within the block state (array) 702. Each of the one or more states may include a unique layout 703 of GUI elements 704. In other words, the block state (array) 702 may include a layout 703. Within the layout 703 of the block state (array) 702, GUI elements 704 may be embedded.

The block 701 may be nestable at a plurality of levels. A nested experience block may include an individual or independent set of rules (array) 705. Each individual rule 706 from the set of rules (array) 705 may determine one or more conditions upon which a specific block may be displayed. In other words, each individual rule 706 may determine what state is to be rendered on a user device under defined conditions. It should be noted that for each experience block, determination of the state 711 may be based on at least one of the one or more conditions 707.

The one or more conditions may be, for example, IF [x] is [operator]=[A] then State=[1]; IF [x] is [operator]=[A] AND [y] is [operator]=[B] then State=[1]. It should be noted that the one or more conditions may be variable (i.e., the declared variable) or a user session-derived (i.e., size of screen or type of user device). A source 708 of the one or more conditions 707 may be selected from user profile database (e.g., user DB profile driven 709, and a user DB profile driven 710). More particularly, the source 708 may be selected from dimensions, and individual dimension array of the user profile database. It should be noted that if any experience block is nested within another experience block, it may retain its independence in terms of rules logic.

Figure 8:
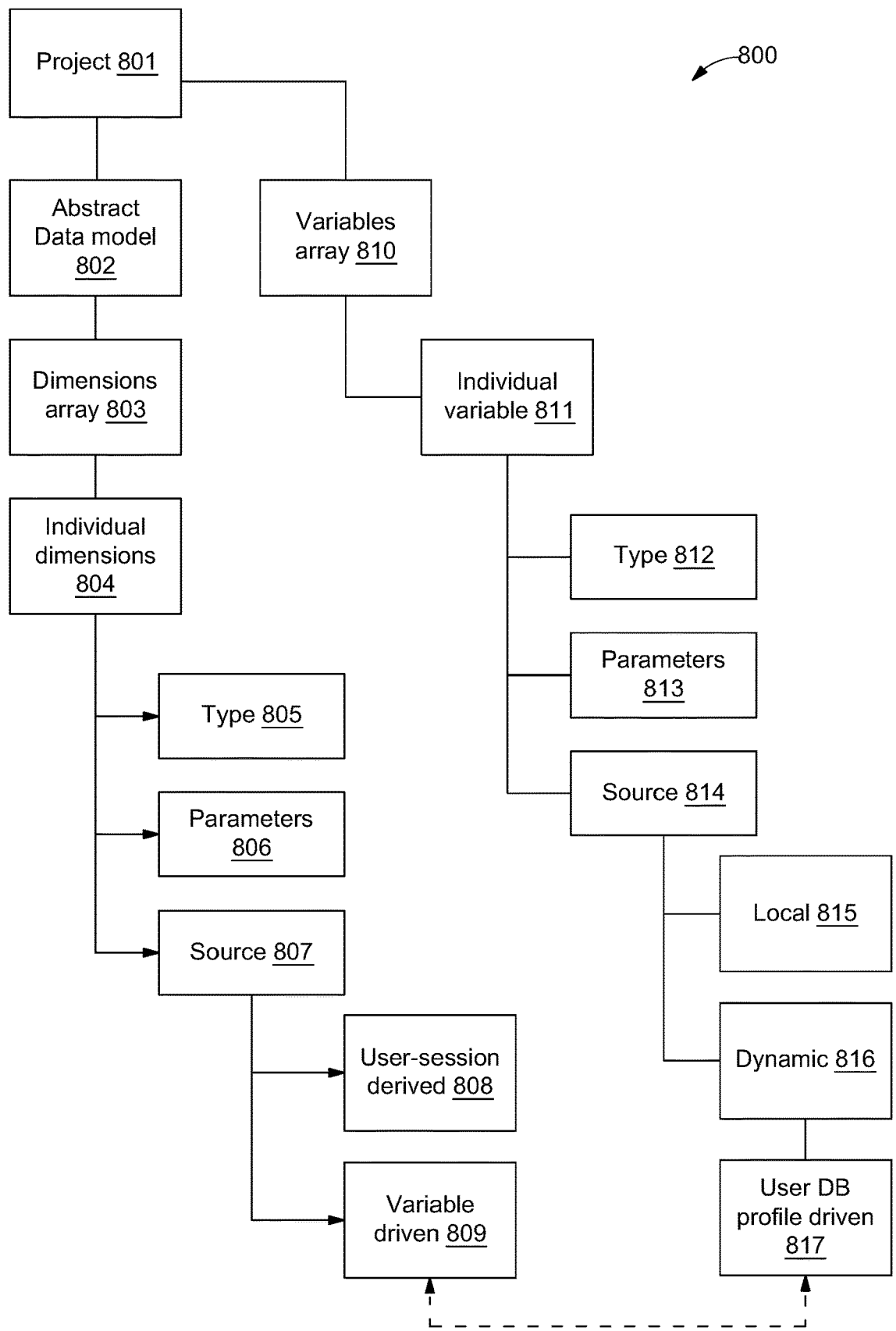
FIG. 8 is a structural diagram of an abstract data model of a project, in accordance with an exemplary embodiment of the present disclosure.

FIG. 8 is a structural diagram 800 of an abstract data model of a project, in accordance with an exemplary embodiment of the present disclosure. FIG. 8 is explained in conjunction with elements from FIGS. 1, 2, 3, 4, 5, 6, and 7. The structural diagram 800 illustrates a project 801. It should be noted that a project 801 of the present FIG. 8 may be analogous to the project 601 of the FIG. 6. The project 801 may include an abstract data model 802 of the user. The abstract data model may correspond to the user profile parameters that may be retrieved from the user profile database of the corresponding user.

The abstract data model 802 may include dimensions array 803. Further, the dimensions array 803 may include one or more individual dimensions 804. Further, the one or more individual dimensions 804 may include a dimension type 805, parameters 806, and a source 807. The source may be user-session driven 808 (i.e. a device type, a browser size, an internet speed, a location, a default browser language, a cookie-based) or may be a variable driven 809. The variable driven source may be linked to a dynamic 816, and a user database profile driven 817.

The project 801 may further include variables array 810. The variables array 810 may include one or more individual variables 811. Further, the one or more individual variables 810 may include a variable type 812, parameters 813, and a source 814. The source may be local 815 (i.e., static information that is stored within the project 801) or dynamic 816 (i.e., dynamic information that is retrieved at run-time from an underlying system of record (Service-Oriented application, DBs, CMSs, etc.). The dynamic variable source may be linked to the user database profile driven 817.

Figure 9:
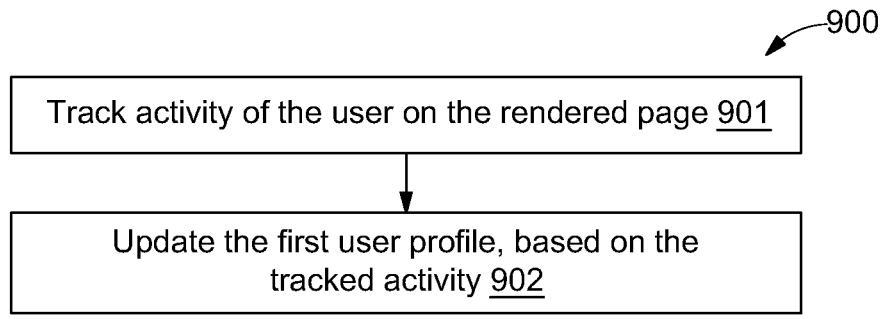
FIG. 9 is a flow diagram of an exemplary process for updating a first user profile of a user, in accordance with an exemplary embodiment of the present disclosure.

FIG. 9 is a flow diagram of an exemplary process 900 for updating a first user profile of a user, in accordance with an exemplary embodiment of the present disclosure. FIG. 9 is explained in conjunction with elements from FIGS. 1, 2, 3, 4, 5, 6, 7, and 8. In an embodiment, the process 900 may be implemented by the server 101. It should be noted that the process 900 may be in continuation of the process 400. In other words, upon rendering a hyper-personalized page on the user device through the process 400, the server 101 may update the first user profile through the process 900. The process 900 may include tracking, by the server, activity of the user on the rendered page, at step 901. The tracked activity may be, for example, but not limited to, time spent on the page, user actions on the page, user interaction with the GUI elements of the page.

Further, the process 900 may include updating, by the server, the first user profile, based on the tracked activity, at step 902. In addition to the updating of the first user profile, the server 101 may further update the set of parameter values, based on the tracked activity.

Figure 10:
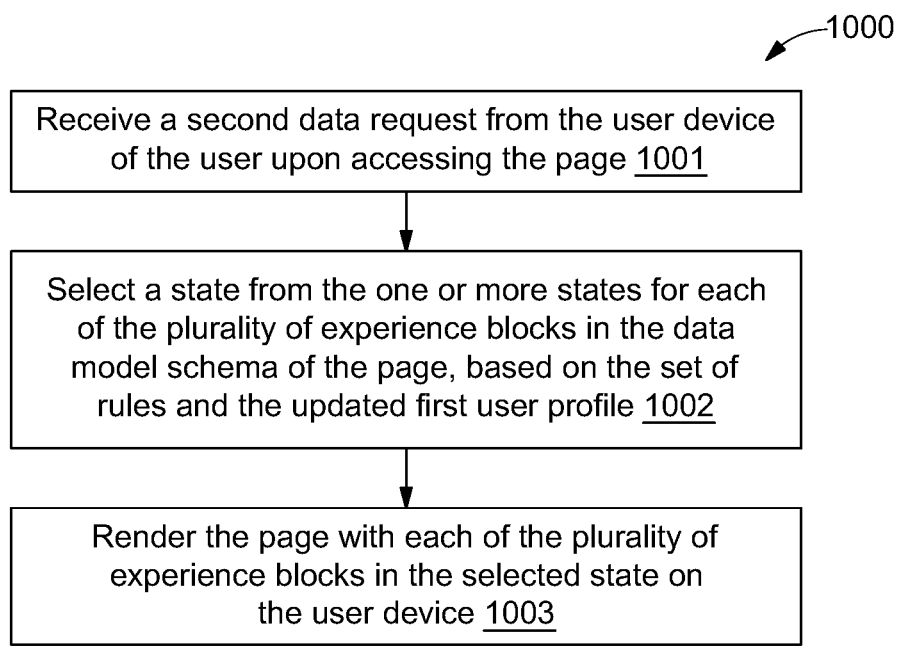
FIG. 10 is a flow diagram of an exemplary process for rendering a page in hyper-personalized state on user device based on updated user profile, in accordance with an exemplary embodiment of the present disclosure.

FIG. 10 is a flow diagram of an exemplary process 1000 for rendering a page in hyper-personalized state on the user device based on updated user profile, in accordance with an exemplary embodiment of the present disclosure. FIG. 10 is explained in conjunction with elements from FIGS. 1, 2, 3, 4, 5, 6, 7, 8, and 9. In an embodiment, the process 800 may be implemented by the server 101. It should be noted that the process 1000 may be in continuation of the process 900. In other words, upon updating the first user profile of the user through the process 800, the server 101 may render a page of the application in a hyper-personalized state on the user device based on updated user profile through the process 1000.

The process 1000 may include receiving, by the server, a second data request from the user device of the user upon accessing the page, at step 1001. It should be noted that the first data request may be received at a first time-instance and the second data request may be received at a second time-instance after the first time-instance. More particularly, the first data request may be received at the first time-instance before updating the first user profile and the second data request may be received at the second time-instance after updating the first user profile.

Further, the process 1000 may include selecting, by the server, a state from the one or more states for each of the plurality of experience blocks in the data model schema of the page, based on the set of rules and the updated first user profile, at step 1002.

Further, the process 1000 may include rendering, by the server, the page with each of the plurality of experience blocks in the selected state on the user device, at step 1003. The selected state may be a hyper-personalized state of the page rendered on the user device corresponding to the updated first user data profile. It should be noted that for each user, different hyper-personalization experiences may be provided on the user device based on the updated user profile corresponding to each user.

Figure 11:
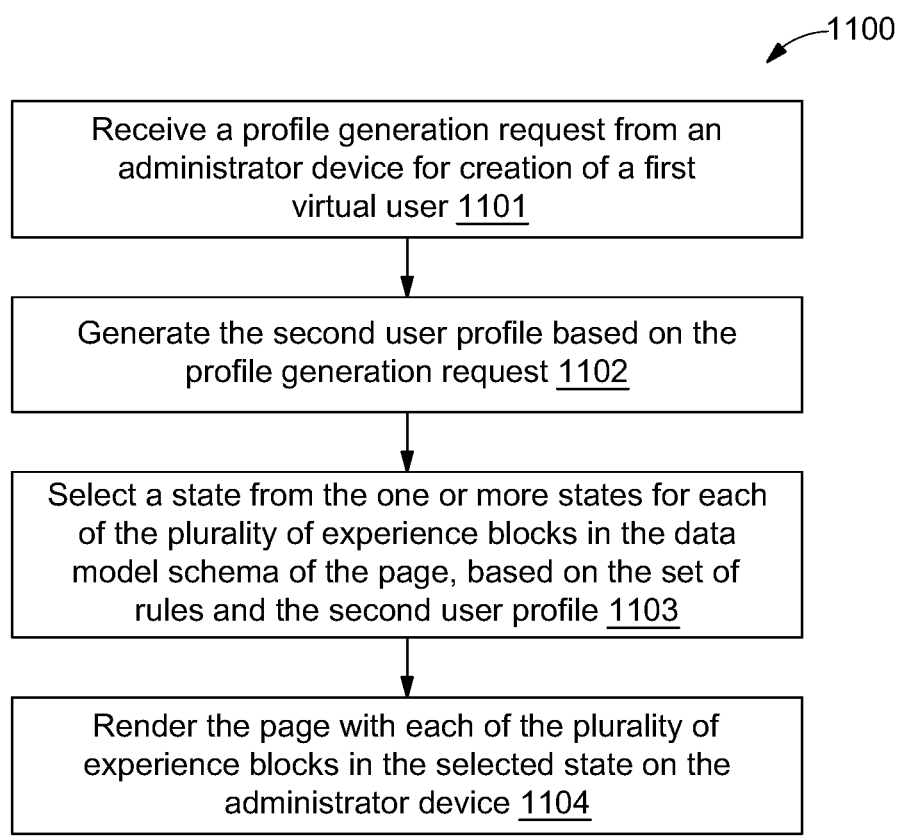
FIG. 11 is a flow diagram of a detailed exemplary process for simulation of hyper-personalization of user experience, in accordance with an exemplary embodiment of the present disclosure.

FIG. 11 is a flow diagram of an exemplary process 1100 for simulation of hyper-personalization of user experience, in accordance with an exemplary embodiment of the present disclosure. FIG. 11 is explained in conjunction with elements from FIGS. 1, 2, 3, 4, 5, 6, 7, 8, 9, and 10. In an embodiment, the process 1100 may be implemented by the server 101. The process 1100 may include receiving, by the server 101, a profile generation request from an administrator device (such as, the administrator device 102) for creation of a first virtual user, at step 1101. The profile generation request may include data for generation of a second user profile for the first virtual user.

Further, the process 1100 may include generating, by the server 101, the second user profile based on the profile generation request, at step 1102. Further, the process 1100 may include selecting, by the server 101, a state from the one or more states for each of the plurality of experience blocks in the data model schema of the page, based on the set of rules and the second user profile, at step 1103.

Further, the process 1100 may include rendering, by the server 101, the page with each of the plurality of experience blocks in the selected state on the administrator device 102, at step 1104. It should be noted that the selected state may be one of a default state or a hyper-personalized state depending on availability of second user profile associated with the virtual user.

By way of an example, when the virtual user is rendering the page of the application for the first time, in that case the page rendered to the virtual user may be in a default state. By way of another example, when the virtual user is rendering the page of the application other than the first time and after generation of the second user profile, in that case the page rendered to the virtual user may be in a hyper-personalized state.

Figure 12:
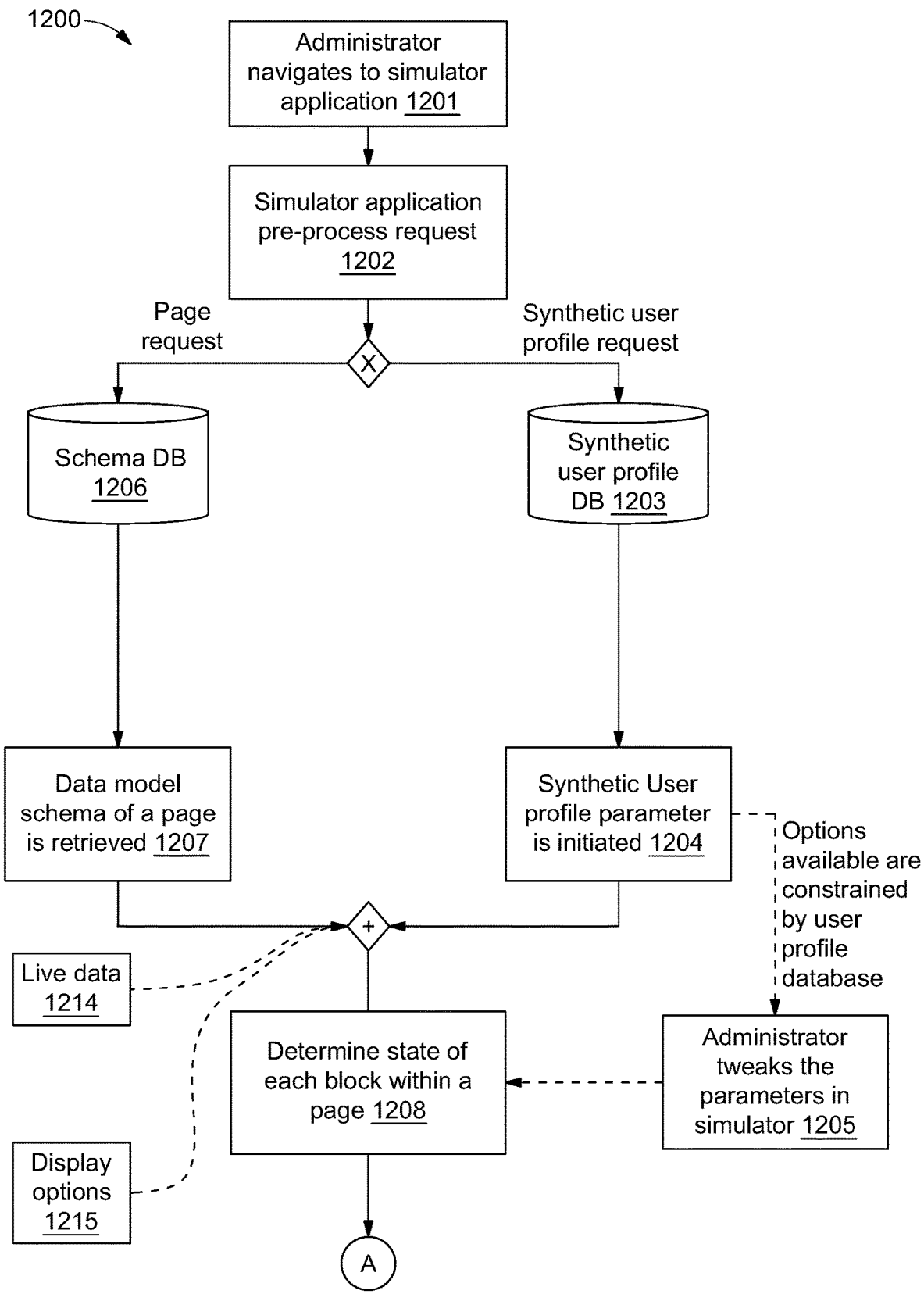
FIG. 12 is a flow diagram of an exemplary control logic for simulation of hyper-personalization of user experience, in accordance with an exemplary embodiment of the present disclosure.

FIG. 12 is a flow diagram that illustrates a detailed exemplary control logic 1200 for simulation of hyper-personalization of user experience, in accordance with an exemplary embodiment of the present disclosure. FIG. 12 is explained in conjunction with elements from FIGS. 1, 2, 3, 4, 5, 6, 7, 8, 9, 10, and 11. In an embodiment, the control logic 1200 may be implemented by the simulation engine 205 of the server 101. At step 1201, an administrator of an administrator device (e.g., the administrator device 102) may navigate to a simulator application (e.g., the simulation engine 205).

Based on navigation, the simulator application may pre-process data request, at step 1202. Upon pre-processing the data request, the simulator application may share a page request with a schema database and a synthetic user profile request with a synthetic user profile database. In case of the synthetic user profile request, the control logic 1200 may search for a synthetic user profile of a virtual user from the synthetic user profile database, at step 1203. Further, a set of synthetic user profile parameters may be initiated from the synthetic user profile database, at step 1204. Further, one or more options available may be constrained by the synthetic user database. The administrator may tweak the synthetic user parameters in the simulator application, at step 1205.

In case of the page request, the control logic 500 may search for the page from the schema database, at step 1206. Further, a data model schema of the page may be retrieved from the schema database, at step 1207. The data model schema of the page may include a plurality of experience blocks, each of the plurality of experience blocks may include one or more states (e.g., default state or hyper-personalized state), and each of the one or more states may include a unique layout of GUI elements.

Once the page request and the synthetic user profile request are pre-processed, further, at step 1208, a state of each experience block within the page may be determined based on a set of rules associated with the data model schema, based on live data 1214 and based on the synthetic user profile parameters. Each of the set of rules may include one or more conditions corresponding to at least one synthetic user parameter and an associated state of an experience block. The condition may be a mapping between at least one synthetic user parameter and the associated state of an experience block. For each experience block of the plurality of experience blocks, determination of the state may be based on at least one of the one or more conditions.

In addition to determination of the state, the control logic 1200 may further determine whether to generate a hyper-personalized page or to generate a default page based on the set of rules, at step 1209. Further, the control logic 1200 may generate the hyper-personalized page on a user-side (i.e., on the administrator device 102) at run-time, at step 1210.

Thereafter, a hyper-personalized experience may be provided to the administrator, at step 1211. It should be noted that the hyper-personalized experience may be provided to the administrator by rendering a hyper-personalized page on the administrator device 102 via a GUI having a display with one or more display options 1215.

As the hyper-personalized page is generated for the administrator, in a similar way, a default page (e.g., generic version of page or a baseline simulation page) may be generated at run-time on the user-side, at step 1212. Further, the generic or baseline simulation experience may be presented to the administrator, at step 1213.

FIG. 13 illustrates an exemplary user profile database 1300 of a user, in accordance with an exemplary embodiment of the present disclosure. FIG. 13 is explained in conjunction with elements from FIGS. 1, 2, 3, 4, 5, 6, 7, 8, 9, 10, 11, and 12. The exemplary user profile database 1300 may include a first column, a second column, a third column, and a fourth column. The first column may be of a source type 1301. The second column may be of a dimension 1302. The third column may be of a dimension type 1303. The fourth column may be of options 1304.

The source type 1301 may be, for example, 'user-session driven'. The exemplary user profile database 1300 may include a set of user parameters of the user. The dimension 1302 may include a set of user parameters corresponding to each source type of the user. The set of user parameters may be, for example, 'IP location' of the user accessing the corresponding page, 'shipment speed-driver' information, 'price sensitivity driver' information, 'preferred payment method' of the user, 'language' of the user, 'loyalty level' of the user, 'assistive expecation level' of the user, 'assistive channel preference' of the user, or 'size' of product.

Each set of the user parameters may include an associated set of parameter values, as depicted in the third and fourth column of the present FIG. 13. For the parameter 'IP location', the corresponding set of user parameters may be, for example, 'USA', 'Italy', etc. Similarly, for the parameter 'shipment speed-driver' the corresponding set of user parameters may be, for example, 'Low', 'Medium', 'High', etc. For the parameter 'Price sensitivity driver', the corresponding set of user parameters may be, for example, 'Low', 'Medium', etc. For the parameter 'Preferred payment method' the corresponding set of user parameters may be, for example, 'Cash, Points', etc. For the parameter 'Language' the corresponding set of user parameters may be, for example, 'English', 'Italic', 'Spanish', 'Hindi', etc. For the parameter 'Loyalty level' the corresponding set of user parameters may be, for example, 'L1', 'L2', 'L3', 'L4', etc. For the parameter 'Assistive Expecation level' the corresponding set of user parameters may be, for example, 'Low', 'Medium', 'High', 'Very High', etc. For the parameter 'Assistive Channel Preference' the corresponding set of user parameters may be, for example, 'Generic', 'Online chat', etc. For the parameter 'Size' the corresponding set of user parameters may be, for example, 'Standard', 'Medium', 'small', etc. Therefore, based on the set of user profile parameters, a hyper-personalized experience may be provided to one or more users. This is explained in greater detail in conjunction with FIGS. 14A-14I.

FIGS. 14A-14I illustrate exemplary GUIs presenting a plurality of experience blocks in one or more states, in accordance with an exemplary embodiment of the present disclosure. FIGS. 14A-14I is explained in conjunction with elements from FIGS. 1, 2, 3, 4, 5, 6, 7, 8, 9, 10, 11, 12, and 13. It should be noted that the plurality of experience blocks shown in FIGS. 14A-14I may of an exemplary buy box component corresponding to an E-commerce web application.

As presented in the present FIG. 14A, an exemplary GUI 1400A illustrates a page 1402 with a plurality of experience blocks to a 'user A' in a default state. The 'user A' may be a user that may be rendering the page 1402 of the application for the first time. In this scenario the 'user A' may not get any recommendation at the time of buying a product. By way of an example, the 'user A' may have to manually select size of a product that the 'user A' wishes to buy. This may be a scenario in case when no record of user profile 1401 corresponding to the 'user A' is found in the user profile database.

FIG. 14B illustrates another exemplary GUI 1400B of a page 1404 presented to a 'user B' with a plurality of experience blocks in a hyper-personalized state. The page 1404 may be generated based on retrieving a set of user profile parameters 1403 corresponding to the 'user B' from the user profile database.

In this scenario, the 'user B' may automatically get size recommendation once the page 1404 is rendered on the user device based on previous purchase history of the 'user B'. By way of an example, as depicted in present FIG. 14B, as the size of the 'user B' is 'known' based on the previous purchase history, the page 1404 may be rendered with recommendation of size as 'SMALL', 'Based on your previous purchases, SMALL should fit perfect'.

It should be noted that each hyper-personalized page rendered on GUIs may be different for different user profiles. For example, as illustrated in FIG. 14C, an exemplary GUI 1400C presenting a page 1406 in a hyper-personalized state based on a set of user profile parameters 1405 of a 'user C' may be different from an exemplary GUI 1400D presenting a page 1408 in a hyper-personalized state based on a set of user profile parameters 1407 of a 'user D', of FIG. 14D. Further, as illustrated in FIG. 14E, an exemplary GUI 1400E presenting a page 1410 in a hyper-personalized state based on a set of user profile parameters 1409 of a 'user E' may be different from an exemplary GUI 1400F presenting a page 1412 in a hyper-personalized state based on a set of user profile parameters 1411 of a 'user F', of FIG. 14F. Similarly, an exemplary GUI 1400E of FIG. 14G presenting a page 1414 in a hyper-personalized state based on a set of user profile parameters 1413 of a 'user G' may be different from an exemplary GUI 1400H and an exemplary GUI 1400I of FIG. 14H and FIG. 14I presenting a page 1416 and a page 1418 in a hyper-personalized state based on a set of user profile parameters 1415 of a 'user H', and based on a set of user profile parameters 1417 of a 'user I', respectively.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 15:
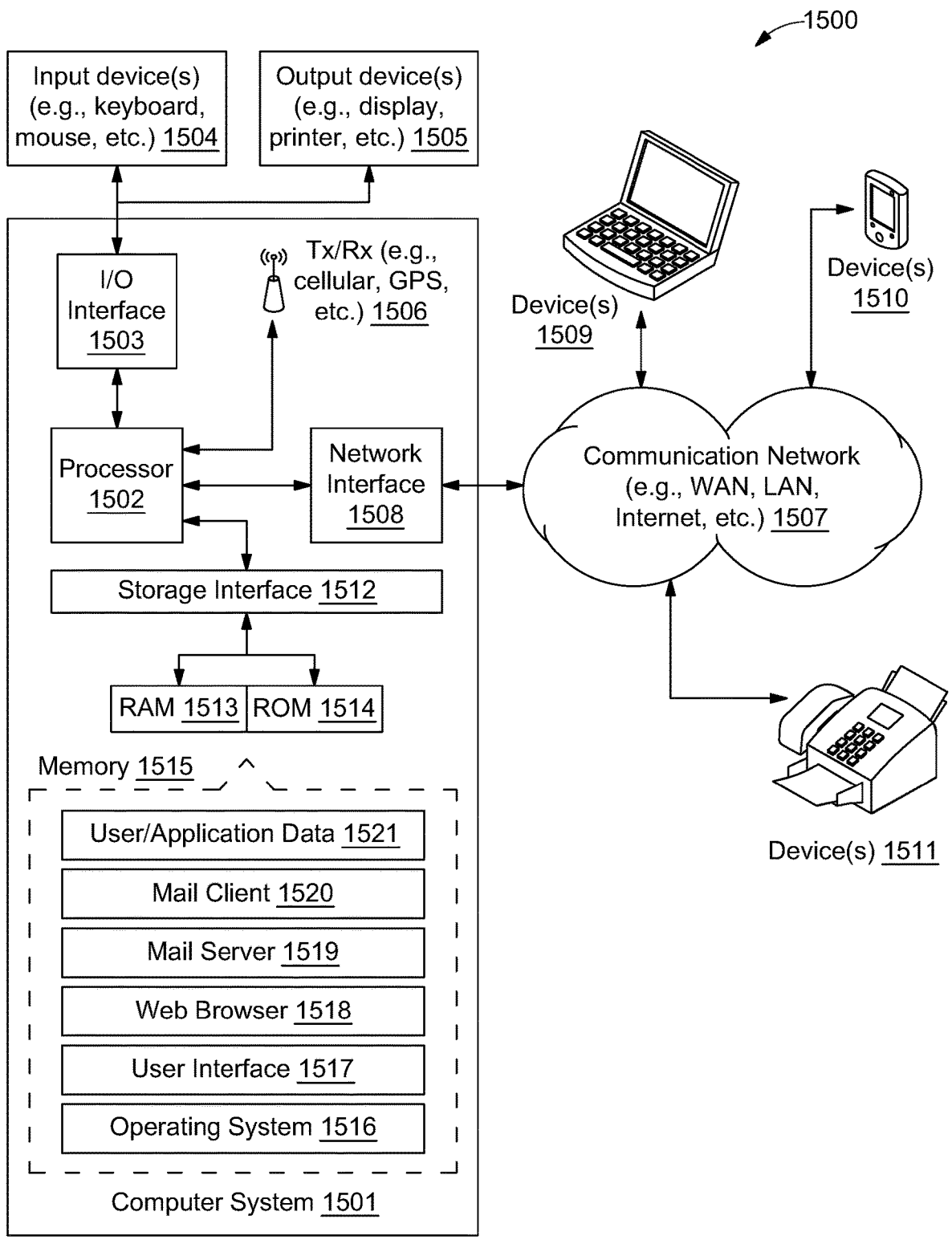
FIG. 15 is a block diagram that illustrates a system architecture of a computer system for hyper-personalization of user experience, in accordance with an exemplary embodiment of the present disclosure.

The disclosed methods and systems may be implemented on a conventional or a general-purpose computer system, such as a personal computer (PC) or server computer. FIG. 15 is a block diagram that illustrates a system architecture 1500 of a computer system 1501 for hyper-personalization of user experience, in accordance with an exemplary embodiment of the present disclosure. Variations of computer system 1501 may be used for implementing server 101 for hyper-personalization of user experience. Computer system 1501 may include a central processing unit ("CPU" or "processor") 1502. Processor 1502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1502 may be disposed in communication with one or more input/output (I/O) devices via I/O interface 1503. The I/O interface 1503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1503, the computer system 1501 may communicate with one or more I/O devices. For example, the input device 1504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1505 may be a printer, fax machine, video display (e.g., cathode ray tube (CRT), liquid crystal display (LCD), light-emitting diode (LED), plasma, or the like), audio speaker, etc. In some embodiments, a transceiver 1506 may be disposed in connection with the processor 1502. The transceiver 1506 may facilitate various types of wireless transmission or reception. For example, the transceiver 1506 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1502 may be disposed in communication with a communication network 1507 via a network interface 1508. The network interface 1508 may communicate with the communication network 1507. The network interface 1508 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1507 may include, without limitation, a direct interconnection, local area network (LAN), wide area network (WAN), wireless network (e.g., using Wireless Application Protocol), the Internet, etc. Using the network interface 1508 and the communication network 1507, the computer system 1501 may communicate with devices 1505, 1509, 1510, and 1511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1501 may itself embody one or more of these devices.

In some embodiments, the processor 1502 may be disposed in communication with one or more memory devices 1515 (e.g., RAM 1513, ROM 1514, etc.) via a storage interface 1512. The storage interface 1512 may connect to memory devices 1515 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1515 may store a collection of program or database components, including, without limitation, an operating system 1516, user interface 1517, web browser 1518, mail server 1519, mail client 1520, user/application data 1521 (e.g., any data variables or data records discussed in this disclosure), etc. The operating system 1516 may facilitate resource management and operation of the computer system 1501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 1517 may facilitate display, execution, interaction, manipulation, or operation of program components through textual or graphical facilities. For example, user interfaces may provide computer interaction interface elements on a display system operatively connected to the computer system 1501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1501 may implement a web browser 1518 stored program component. The web browser 1518 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1501 may implement a mail server 1519 stored program component. The mail server 1519 may be an Internet mail server such as MICROSOFT® EXCHANGE®, or the like. The mail server 1519 may utilize facilities such as ASP, ActiveX, ANSI C++/C #, MICROSOFT .NET® CGI scripts, JAVA®, JAVASCRIPT®, PERL®, PHP®, PYTHON®, WebObjects, etc. The mail server 1519 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1501 may implement a mail client 1520 stored program component. The mail client 1520 may be a mail viewing application, such as APPLE MAIL®, MICROSOFT ENTOURAGE®, MICROSOFT OUTLOOK®, MOZILLA THUNDERBIRD®, etc.

In some embodiments, computer system 1501 may store user/application data 1521, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of proving personalized experience to the user. Classical or traditional personalization technologies focus on content recommendation and price generation. Thus, the disclosed method and system may provide a hyper-personalized user experience to the user. The method and system may initially receive a data request from a user device of a user upon accessing a page of an application hosted by a server. The page may include a plurality of experience blocks. Each of the plurality of experience blocks may include one or more states. Each of the one or more states may include a unique layout of Graphical User Interface (GUI) elements. Further, the method and system select a state from the one or more states for each of the plurality of experience blocks in a data model schema of the page, based on a set of rules and a first user profile of the user associated with the first data request. Further, the method and system render the page with each of the plurality of experience blocks in the selected state on the user device to provide a hyper-personalized user experience to the user.

As will be appreciated by those skilled in the art, the techniques described in the various embodiments discussed above are not routine, or conventional, or well understood in the art. The techniques discussed above provide for hyper-personalization of user experience. The techniques may be capable of providing hyper-personalized experience to the user based on retrieving user profile from the user profile database and data model schema from the experience schema database. From the above disclosed techniques, a different hyper-personalized page may be generated for different users, as each user may have a different set of user profile parameters. Further, the techniques discussed above may be applied in retail sector, E-commerce sector, online advertising sector, social media sector, telecommunications sector, insurance sector, automotive industry, financial services, travel sector, transportation sector, logistics sector, real estate sector, public and social sector, sports sector, energy sector, mining sector, healthcare sector, education sector, or consumer packaged goods sector. Moreover, the techniques discussed above may be implemented on one of a consumer website, an enterprise website, a consumer web application, an enterprise web application, or an instore display application to provide decision experience, transactional experience, educational experience, browsing and consumption experience, or assistive experience.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for hyper-personalization of user experience. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for hyper-personalization of user experience on a web application, comprising:
   receiving, by a server, a first data request from a user device for accessing, using a web application session of the user device, a web application page of the web application hosted by the server, wherein:
      the web application page is associated with a data model schema that comprises a plurality of experience blocks,
      each of the plurality of experience blocks comprises one or more states, and
      each of the one or more states comprises a unique layout of Graphical User Interface (GUI) elements for a corresponding experience block;
   retrieving, by the server, based on the reception of the first data request, the data model schema of the web application page from a schema database;
   querying, by the server, based on the reception of the first data request, a user profile database to identify a user profile of a user associated with the first data request, wherein a first user profile of the user is identified based on the querying of the user profile database, and wherein the first user profile comprises a set of variable user parameters;
   determining one or more data model dimensions represented within a page-associated variable array of the data model schema based on the web application session;
   selecting a source of at least one condition from the determined one or more data model dimensions, wherein the at least one condition is derived from the web application session;
   selecting, by the server, a state from the one or more states for each of the plurality of experience blocks in the retrieved data model schema of the web application page, based on a set of rules, the at least one condition derived from the web application session, and the set of variable user parameters, wherein each of the set of rules is indicative of a mapping between at least one user parameter of the set of variable user parameters and the one or more states of the corresponding experience block;
generating, by the server, a first hyper-personalized web application page including each of the plurality of experience blocks in the selected state; and
injecting, by the server, the generated first hyper-personalized web application page into the web application, wherein the first hyper-personalized web application page is rendered on the user device in response to the first data request.

2. The method of claim 1, wherein the first user profile further comprises a set of parameter values for the set of variable user parameters.

3. The method of claim 2, wherein for each of the plurality of experience blocks, the one or more states comprise a default state.

4. The method of claim 3, further comprising:
determining, by the server, an absence of a user profile of the user in the user database, based on the querying; and
generating, by the server, the first user profile of the user, wherein:
the set of parameter values correspond to a set of default values,
the selected state for each of the plurality of experience blocks is the default state, and
the selection of the default state for each of the plurality of experience blocks is based on the set of parameter values.

5. The method of claim 1, wherein each of the plurality of experience blocks is nestable at a plurality of levels, and wherein a nested experience block comprises an independent set of rules.

6. The method of claim 1, wherein each of the set of rules comprises one or more conditions corresponding to the at least one user parameter and an associated state of an experience block, and wherein, for each experience block of the plurality of experience blocks, determination of the state is based on at least one of the one or more conditions.

7. The method of claim 6, further comprising computing, by the server, each of the one or more conditions based on the data model schema based on one of a user session, a declared variable, or the at least one user parameter of the first user profile.

8. The method of claim 1, wherein the at least one condition comprises at least one of a screen size of the user device or a type of the user device and controls a rendering state for each of the plurality of experience blocks.

9. The method of claim 1, further comprising:
receiving, by the server, a profile generation request from an administrator device for creation of a first virtual user, wherein the profile generation request includes data for generation of a second user profile for the first virtual user; and
generating, by the server, the second user profile based on the profile generation request.

10. The method of claim 9, further comprising:
selecting, by the server, a state from the one or more states for each of the plurality of experience blocks in the data model schema of the page, based on the set of rules and the second user profile;
generating, by the server, a second hyper-personalized page, wherein the second hyper-personalized page includes each of the plurality of experience blocks in the state selected based on the set of rules and the second user profile; and
injecting, by the server, the second hyper-personalized page, wherein the second hyper-personalized page is rendered on the administrator device.

11. The method of claim 2, further comprising:
tracking, by the server, activity of the user on the rendered first hyper-personalized page; and
updating, by the server, the first user profile, based on the tracked activity, wherein the set of parameter values are updated, based on the tracked activity.

12. The method of claim 11, further comprising:
receiving, by the server, a second data request from the user device of the user upon accessing the page, wherein the first data request is received at a first time-instance and the second data request is received at a second time-instance after the first time-instance;
selecting, by the server, a state from the one or more states for each of the plurality of experience blocks in the data model schema of the page, based on the set of rules and the updated first user profile; and
rendering, by the server, the first hyper-personalized page with each of the plurality of experience blocks in the selected state on the user device.

13. A system for hyper-personalization of user experience on a web application, comprising:
a processing circuitry; and
a memory communicatively coupled to the processing circuitry, wherein the memory stores processor instructions, which when executed by the processing circuitry, cause the processing circuitry to:
receive a first data request from a user device for accessing, using a web application session of the user device, a web application page of the web application hosted by the memory, wherein:
the web application page is associated with a data model schema that comprises a plurality of experience blocks,
each of the plurality of experience blocks comprises one or more states, and
each of the one or more states comprises a unique layout of Graphical User Interface (GUI) elements for a corresponding experience block;
retrieve, based on the reception of the first data request, the data model schema of the web application page from a schema database;
query, based on the reception of the first data request, a user profile database to identify a user profile of a user associated with the first data request, wherein a first user profile of the user is identified based on the querying of the user profile database, and wherein the first user profile comprises a set of variable user parameters;
determine one or more data model dimensions represented within a page-associated variable array of the data model schema based on the web application session;
select a source of at least one condition from the determined one or more data model dimensions, wherein the at least one condition is derived from the web application session;
select a state from the one or more states for each of the plurality of experience blocks in the retrieved data model schema of the web application page, based on a set of rules, the at least one condition derived from the web application session, and the set of variable user parameters, wherein each of the set of rules is indicative of a mapping between at least one user parameter of the set of variable user parameters and the one or more states of the corresponding experience block;

generate a first hyper-personalized web application page including each of the plurality of experience blocks in the selected state; and inject the generated first hyper-personalized web application page into the web application, wherein the first hyper-personalized web application page is rendered on the user device in response to the first data request.

14. The system of claim 13, wherein the first user profile further comprises a set of parameter values for the set of variable user parameters.

15. The system of claim 13, wherein for each of the plurality of experience blocks, the one or more states comprise a default state.

16. The system of claim 15, wherein the processor instructions, on execution, further cause the processing circuitry to:

determine an absence of a user profile of the user in the user database, based on the querying; and generate the first user profile of the user, wherein:

the set of parameter values correspond to a set of default values, the selected state for each of the plurality of experience blocks is the default state, and the selection of the default state for each of the plurality of experience blocks is based on the set of parameter values.

17. The system of claim 13, wherein each of the plurality of experience blocks is nestable at a plurality of levels, and wherein a nested experience block comprises an independent set of rules.

18. The system of claim 13, wherein each of the set of rules comprises one or more conditions corresponding to the at least one user parameter and an associated state of an experience block, and wherein, for each experience block of the plurality of experience blocks, determination of the state is based on at least one of the one or more conditions.

19. The system of claim 13, wherein the at least one condition comprises at least one of a screen size of the user device or a type of the user device and controls a rendering state for each of the plurality of experience blocks.

20. The method of claim 11, wherein the tracked activity of the user comprises a time spent by the user on the rendered first hyper-personalized page.

* * * * *